(12) United States Patent
Peacock et al.

(10) Patent No.: US 10,260,334 B2
(45) Date of Patent: Apr. 16, 2019

(54) GAS LIFT ANALYSIS AND TROUBLESHOOTING

(71) Applicant: WellTracer Technology, LLC, Katy, TX (US)

(72) Inventors: Larry Peacock, Katy, TX (US); Dan Dees, Katy, TX (US); John Lund, Katy, TX (US)

(73) Assignee: Welltracer Technology, LLC, Katy, TX (US)

( * ) Notice: Subject to any disclaimer, the term of this patent is extended or adjusted under 35 U.S.C. 154(b) by 0 days.

(21) Appl. No.: 15/316,496

(22) PCT Filed: Jun. 9, 2014

(86) PCT No.: PCT/US2014/041532
§ 371 (c)(1),
(2) Date: Dec. 5, 2016

(87) PCT Pub. No.: WO2015/191026
PCT Pub. Date: Dec. 17, 2015

(65) Prior Publication Data
US 2017/0183955 A1    Jun. 29, 2017

(51) Int. Cl.
*E21B 47/10* (2012.01)
*E21B 43/12* (2006.01)
*E21B 47/00* (2012.01)
*E21B 47/06* (2012.01)
*E21B 49/08* (2006.01)
(Continued)

(52) U.S. Cl.
CPC ........ *E21B 47/1015* (2013.01); *E21B 43/122* (2013.01); *E21B 47/00* (2013.01); *E21B 47/0007* (2013.01); *E21B 47/06* (2013.01); *E21B 47/065* (2013.01); *E21B 49/08* (2013.01); *E21B 49/087* (2013.01);
(Continued)

(58) Field of Classification Search
CPC .. E21B 47/1015; E21B 43/122; E21B 43/123; E21B 49/087; E21B 41/0092
See application file for complete search history.

(56) References Cited

U.S. PATENT DOCUMENTS 5,031,697 A    7/1991  Wellington et al.
2008/0202763 A1  8/2008  Lafferty et al.
(Continued)

OTHER PUBLICATIONS

International Search Report and Written Opinion dated Dec. 15, 2014 for related PCT patent application No. PCT/US2014/041532.

*Primary Examiner* — Zakiya W Bates
(74) *Attorney, Agent, or Firm* — D'Ambrosio & Menon, PLLC; Usha Menon

(57) ABSTRACT

Methods and computer program products for evaluating the performance of a gas lift well. The method includes measuring key gas lift well parameter data and concentration of a tracer present in a substance retrieved from the gas lift well which was injected into the annulus formed between a well casing and a production tubing of the gas lift well. The actual travel time of the tracer which corresponds to a time duration required for injected tracer and lift gas to travel from the injection point, down the annulus, through one or more points of entry of the lift gas into the production tubing is then determined based on a deviation in the concentration of the tracer measured by accounting for variations in a fractal obtained by plotting multiple key well parameter data and a concentration of the tracer in a multi-dimensional time dependent plot.

14 Claims, 14 Drawing Sheets

(51) Int. Cl.
*G01M 3/28* (2006.01)
*E21B 43/34* (2006.01)

(52) U.S. Cl.
CPC ......... *G01M 3/2846* (2013.01); *E21B 43/123* (2013.01); *E21B 43/34* (2013.01)

(56) References Cited

U.S. PATENT DOCUMENTS

| | | |
|---|---|---|
| 2010/0198533 A1 | 8/2010 | Peacock et al. |
| 2012/0084043 A1 | 4/2012 | Courtade et al. |
| 2013/0080117 A1 | 3/2013 | Liu et al. |

GAS LIFT ANALYSIS AND TROUBLESHOOTING

BACKGROUND

Various processes are employed to assist in retrieving oil, water, or a mixture of various fluids from wells when a lack of sufficient reservoir pressure limits well production. One such technique, known as "gas lift," involves injecting a gas into an annulus formed between the well casing and the production tubing within a wellbore. In gas lift wells, gas-lift mandrels having gas-lift valves that are operatively connected thereto are typically installed in the production tubing of the well. Variation between tubing and casing pressures may cause a gas-lift valve to open and close, thereby allowing gas to be injected into the fluid(s) to be retrieved from the well. The injected gas forms air pockets within the fluid and assists in lifting the fluid from the subterranean reservoir and through the wellbore. The invention relates to methods and systems for evaluating the performance of a gas lift well. More specifically, the invention relates to methods and systems for determining points of entry of lift gas into the production tubing within a gas lift well.

SUMMARY

One or more embodiments of the invention are directed to methods, systems, and/or computer program products for determining one or more points of entry of a lift gas from an annulus of a well casing into the production tubing. The points of entry of the lift gas may correspond to entry of the lift gas through gas-lift valves or entry of the lift gas into the production tubing as a result of leaks in the production tubing.

The embodiments of the present invention provide a gas lift well surveying method wherein the gas lift well behavior is reproduced or simulated during its operation. An optimum well operating envelope may be defined to assist the well operator to take necessary troubleshooting or corrective action. The computer-implemented gas lift well surveying method performs a set of mathematical operation on one or key well parameters for evaluating the performance of an operational gas lift well. In one embodiment of the method, an ideal or optimal behavior of the gas lift well is first graphically reproduced by representing a plurality of key well parameter data set corresponding to an ideal gas lift well parameter data set or to an optimally operational gas lift well in a multidimensional time independent plot. After plotting of the data set, one or more patterns in the plotted data are identified. After defining the optimum well operating envelope, a multidimensional time dependent plot is generated by providing multiple key well parameter real time data set. The multidimensional time dependent plot of the real time gas lift well parameter provides a pattern or a fractal and the fractal lines represent actual well operating conditions in real time. Therefore, by inspecting the fractal on a real-time basis, performance of the gas lift well can be evaluated. The key well parameters can include one or more of injection rate, casing mechanical layout, injection pressure, injection temperature, lift gas specific gravity, total produced liquid rate, water cut, formation gas rate, tubing head pressure (THP), casing head pressure (CHP), production separator pressure, production manifold pressure, production temperature and tracer concentration.

In another embodiment, a method evaluating the performance of a gas lift well, for example, an unstable well, may involve a transient analysis. The method involves the transient simulation of the gas lift well which provides non-instantaneous variation in the key well parameters. The non-instantaneous key well parameters may be derived with a dynamic simulator.

The dynamic simulator may be calibrated by one or more real time key well parameter data to drive steady state and non-steady state or transient simulation to account for time dependent variations in one or more key well parameters. The transient data that may be derived from the dynamic simulator may be demonstrated in a multi-dimensional time dependent plot to generate a dynamic graph. The multi-dimensional time dependent plot may specify a relation between the well data in one set of transient data to well data in at least one other set of transient data to indicate a non-instantaneous variation in the gas lift well parameters. The transient simulation derived from the dynamic simulator can also be auto tuned by checking the consistency of a first set of simulator results, for example, current results, against a second set of simulator results (for example, an earlier version) and against steady state calculations based on the real time gas lift well parameter data to ensure an accepted range of variance and validity. The current results may be recalculated on detecting any inconsistency. If the current results may be found to be acceptable, then the dynamic simulator can continue to a next step.

In one embodiment, an error function may be used to compare the results of the dynamic simulation with actual or real time data and to repeat the process until an acceptable match may be found while the dynamic simulator is operational.

In one embodiment, a method for evaluating the performance of a gas lift well comprises: injecting a tracer into an annulus formed between a well casing and a production tubing of the gas lift well, the annulus including a lift gas, the gas lift well including one or more points of communication between the annulus and the production tubing, wherein each of the one or more points of communication corresponds to a valve position; measuring, over a period of time, a concentration of the tracer present in a substance retrieved from the gas lift well; determining one or more actual travel times of the tracer based on a deviation of the concentration of the tracer measured over the period of time from a pattern present in a baseline tracer concentration, wherein each of the one or more actual travel times of the tracer corresponds to a point of entry of one or more points of entry of the lift gas into the production tubing; determining one or more lift gas loss parameters, each of the one or more lift gas parameters corresponding to a point of entry, each of the one or more lift gas loss parameters accounting for an effect of entry of a portion of the tracer into the production tubing at the corresponding point of entry on the actual travel time of the tracer that enters the production tubing at each point of entry located at a depth greater than the corresponding point of entry; calculating a velocity of the lift gas in the annulus and a velocity of the lift gas in the production tubing for each of the plurality of ranges of well depth based on the one or more lift gas loss parameters; applying an injection loss factor to the calculated velocity of the lift gas in the annulus and the velocity of the lift gas in the production tubing to account for a non-instantaneous velocity change, wherein the applied injection loss factor is pre-determined on the basis of: i) approximating a velocity change due to momentum; or ii) calculation of a velocity change due to momentum; and determining the one or more points of entry of the lift gas into the production tubing based on: (i) the one or more actual travel times of the tracer, and (ii) the velocity of the lift gas in the annulus and the velocity of the lift gas in the production tubing that are calculated for each of the plurality of ranges of well depth, wherein one or more of the steps of the method are controlled by at least one computer processor executing one or more computer program instructions stored on at least one memory device operatively coupled to the at least one processor.

In an embodiment of the present invention, a gas lift well performance evaluating method is developed to accurately determine injection of the lift gas in the production tubing through the annulus and the depth of the injection point. The method includes measuring key gas lift well parameter data and concentration of the tracer present in a substance retrieved from the gas lift well which was injected into the annulus formed between a well casing and a production tubing of the gas lift well and entered into the production tubing through the injection point. The injection point may involve gas valves or leaks in the production tubing. The actual travel time of the tracer which corresponds to a time duration required for injected tracer and lift gas to travel from the injection point, down the annulus, through one or more points of entry of the lift gas into the production tubing is then determined based on a deviation in the concentration of the tracer measured by accounting for variation in a fractal obtained by plotting multiple key well parameter data and a concentration of the tracer in a multi-dimensional time dependent plot. Multiple actual travel times of the tracer herein corresponds to multiple points of entry of the lift gas into the production tubing. A lift gas injection loss factor is also determined which may account for an effect of the entry of a portion of the tracer into the production tubing at the corresponding point of entry on the actual travel time of the tracer that enters the production tubing at each point of entry located at a depth greater than the corresponding point of entry. The gas lift well can also be segmented into a plurality of ranges of well depth and the velocity of the lift gas while it travels through the annulus and the production tubing for each of the plurality of ranges of well depth is calculated. The calculation accounts the changes in the velocity due to momentum change and turbulence in flow in the tubing resulting from the entry of a portion of the lift gas into the production tubing at the corresponding point of entry based on the one or more lift gas injection loss and thus provides continuous velocity profile of the lift gas as it travels through the annulus and the production tubing. The determination of the points of lift gas entry in the production tubing is performed based on the actual travel times of the tracer and lift gas and the velocity of the lift gas in the annulus and in the production tubing that are calculated throughout the annulus and the production tubing including the change in the velocity due to momentum change and turbulent flow in the tubing resulting from the entry of a portion of the lift gas into the production tubing. Any kinetic equation which relates time of travel, distance and velocity can be used to determine the lift gas entry depth by involving the actual travel time of the tracer and a complete and continuous velocity profile of the tracer as it travels with the lift gas within the annulus and the production tubing accounting for non-instantaneous changes in the velocity within the actual travel time.

In another embodiment of the invention, the velocity of the lift gas in the annulus is calculated for each of the plurality of ranges of well depth further based on at least one of: (i) a plurality of pressures in the annulus, each of the plurality of pressures corresponding to one of the plurality of ranges of well depth, (ii) a flow rate of the lift gas in the annulus, (iii) an injection pressure of the lift gas, (iv) a volume of the annulus per a unit of well depth, (v) a temperature in the annulus, (vii) a parameter that represents a frictional force opposing flow in the annulus, and (viii) a parameter that represents an effect of gravity on flow in the annulus.

In another embodiment of the invention, the velocity of the lift gas in the production tubing is calculated for each of the plurality of ranges of well depth further based on at least one of: (i) a plurality of pressures in the production tubing, each of the plurality of pressures corresponding to one of the plurality of ranges of well depth, (ii) a flow rate of the lift gas in the production tubing, (iii) a temperature in the production tubing, (iv) a parameter that represents a frictional force opposing flow in the production tubing, (v) a parameter that represents an effect of gravity on flow in the production tubing, (vi) a ratio of a gaseous phase to a non-gaseous phase in the substance retrieved from the gas lift well, (vii) a flow rate of one or more gases present in the substance retrieved from the gas lift well, (viii) a flow rate of one of more liquids present in the substance retrieved from the gas lift well, (ix) a well head pressure, and (x) a separator pressure.

In another embodiment of the invention, a method for evaluating the performance of a multiple installation gas lift well includes injecting a tracer into an annulus formed between a well casing and two or more production tubings of the gas lift well. The annulus includes a lift gas and the two or more production tubings are capable of fluid communication with the annulus and substantially incapable of fluid communication with each other. The gas lift well further includes one or more points of communication between the annulus and each of the two or more production tubings, each of the one or more points of communication corresponding to a valve position. The method further includes, for each of the two or more production tubings: measuring, over a period of time, a concentration of the tracer present in a substance retrieved from the each of the two or more production tubings, determining one or more actual travel times of the tracer based on a deviation of the concentration of the tracer measured over the period of time from a pattern present in a baseline tracer concentration, each of the one or more actual travel times of the tracer corresponding to a point of entry of one or more points of entry of the lift gas into the each of the two or more production tubings, segmenting the gas lift well into a plurality of ranges of well depth, determining one or more lift gas loss parameters, each of the one or more lift gas parameters corresponding to a point of entry, each of the one or more lift gas loss parameters accounting for an effect of entry of a portion of the tracer into the each of the two or more production tubings at the corresponding point of entry on the actual travel time of the tracer that enters the each of the two or more production tubings at each point of entry located at a depth greater than the corresponding point of entry, calculating a velocity of the lift gas in the annulus and a velocity of the lift gas in the each of the two or more production tubings for each of the plurality of ranges of well depth based on the one or more lift gas loss parameters, and determining the one or more points of entry of the lift gas into the each of the two or more production tubings based on: (i) the one or more actual travel times of the tracer, and (ii) the velocity of the lift gas in the annulus and the velocity of the lift gas in the each of the two or more production tubings calculated for each of the plurality of ranges of well depth.

In another embodiment of the invention, a gas lift well surveillance kit includes components for evaluating the performance of a gas lift well. The components include a separator, a tracer measurement device, a device for sensing and measuring pressure and temperature, a flow regulation device, a device for collecting and storing data, and a computer program for evaluating the performance of the gas lift well embodied on a computer-readable medium.

In another embodiment of the invention, a computer-readable medium storing a computer program for evaluating the performance of a gas lift well is disclosed. The gas lift well includes a well casing, a production tubing, an annulus formed between the well casing and the production tubing, the annulus including a lift gas, and one or more points of communication between the annulus and the production tubing, each of the one or more points of communication corresponding to a valve position. The computer program includes instructions for: measuring, over a period of time, a concentration of the tracer present in a substance retrieved from the gas lift well, determining one or more actual travel times of the tracer based on a deviation of the concentration of the tracer measured over the period of time from a pattern present in a baseline tracer concentration, each of the one or more actual travel times of the tracer corresponding to a point of entry of one or more points of entry of the lift gas into the production tubing, segmenting the gas lift well into a plurality of ranges of well depth, determining one or more lift gas loss parameters, each of the one or more lift gas parameters corresponding to a point of entry, each of the one or more lift gas loss parameters accounting for an effect of entry of a portion of the tracer into the production tubing at the corresponding point of entry on the actual travel time of the tracer that enters the production tubing at each point of entry located at a depth greater than the corresponding point of entry, calculating a velocity of the lift gas in the annulus and a velocity of the lift gas in the production tubing for each of the plurality of ranges of well depth based on the one or more lift gas loss parameters, and determining one or more points of entry of the lift gas into the production tubing based on: (i) the one or more actual travel times of the tracer, and (ii) the velocity of the lift gas in the annulus and the velocity of the lift gas in the production tubing that are calculated for each of the plurality of ranges of well depth.

In one or more of the previously disclosed embodiments, the one or more determined points of entry of the lift gas may be compared to the one or more points of communication in order to determine, for each of the one or more determined points of entry of the lift gas, whether the point of entry corresponds to a leak of the lift gas into the production tubing or entry of the lift gas into the production tubing through a valve.

In one or more of the previously disclosed embodiments of the invention, a travel time of the tracer may be calculated for each of the one or more points of communication between the annulus and the production tubing based on the velocity of the lift gas in the annulus and the velocity of the lift gas in the production tubing calculated for each of the plurality of ranges of well depth. Further, a graphical representation of the concentration of the tracer measured over the period of time may be displayed on an output device. The graphical representation may provide an indication of the travel time of the tracer calculated for each of the one or more points of communication between the annulus and the production tubing.

In one or more of the previously disclosed embodiments, the graphical representation may include one or more peaks in the concentration of the tracer measured over the period of time, each of the one of more peaks corresponding to one of the one or more actual travel times, one of the one or more points of entry of the lift gas into the production tubing, and one of the one or more lift gas loss parameters. Further, the one or more lift gas loss parameters may be determined by: (i) determining an area under each of the one or more peaks, (ii) summing each area determined for each of the one or more peaks to obtain a total area, and (iii) determining, for each of the one or more peaks, a ratio of the area under the each of the one or more peaks to the total area, the ratio representing the lift gas loss parameter corresponding to the each of the one or more peaks.

According to another aspect in the present invention, there is also provided a computer program product for executing the above gas lift well performance evaluating methods. The computer usable program code in the computer program product facilitates implementing the above gas lift well performance evaluating methods. A non-transitory computer-readable medium can store a computer program product for evaluating the performance of a gas lift well that includes a well casing, a production tubing, an annulus formed between the well casing and the production tubing, the annulus including a lift gas, and one or more points of communication between the annulus and the production tubing, wherein each of the one or more points of communication corresponds to a valve position. The computer program product comprises computer program instructions for: collecting and plotting a collected key well parameter data set in a multi-dimensional time dependent plot; and running a dynamic simulator based on a real time well parameter data for providing transient simulation of the gas lift well. The computer program product can be embodied in a non-transitory computer-readable medium which can be disposed in active communication with the gas lift well. The non-transitory computer-readable medium is adapted to acquire the gas lift well parameter data form the form sensors in the gas lift well and provides them to the computer program product for executing the gas lift well performance evaluating methods.

DETAILED DESCRIPTION

In one or more embodiments of the invention, the presence and depths of one or more points of entry of a lift gas from an annulus of a gas lift well into production tubing may be determined with accuracy without the need for well intervention. Based on a comparison between the depths of the one or more points of entry and the well configuration, including the positions of gas lift valves along the production tubing, it may be determined whether the points of entry correspond to operating gas lift valve(s) and/or injection gas leak(s) into the production tubing. Thus, one or more embodiments of the invention provide the capability to determine whether a gas lift well is multi-pointing (i.e. lift gas is entering through more than one gas lift valve), whether any leaks exist in the production tubing, or whether the gas lift valve is operating as expected. One or more embodiments of the invention will be described hereinafter with reference to single completion tubular flow well configurations. However, various embodiments of the invention may also be used in connection with concentric lift well configurations (tubular injection with annular production), a combination of concentric lift and tubular flow well configurations (also known as casing flow and tubing flow, respectively), and multiple installation gas lift well configurations (multiple production strings that share a common annulus).

Figure 1:
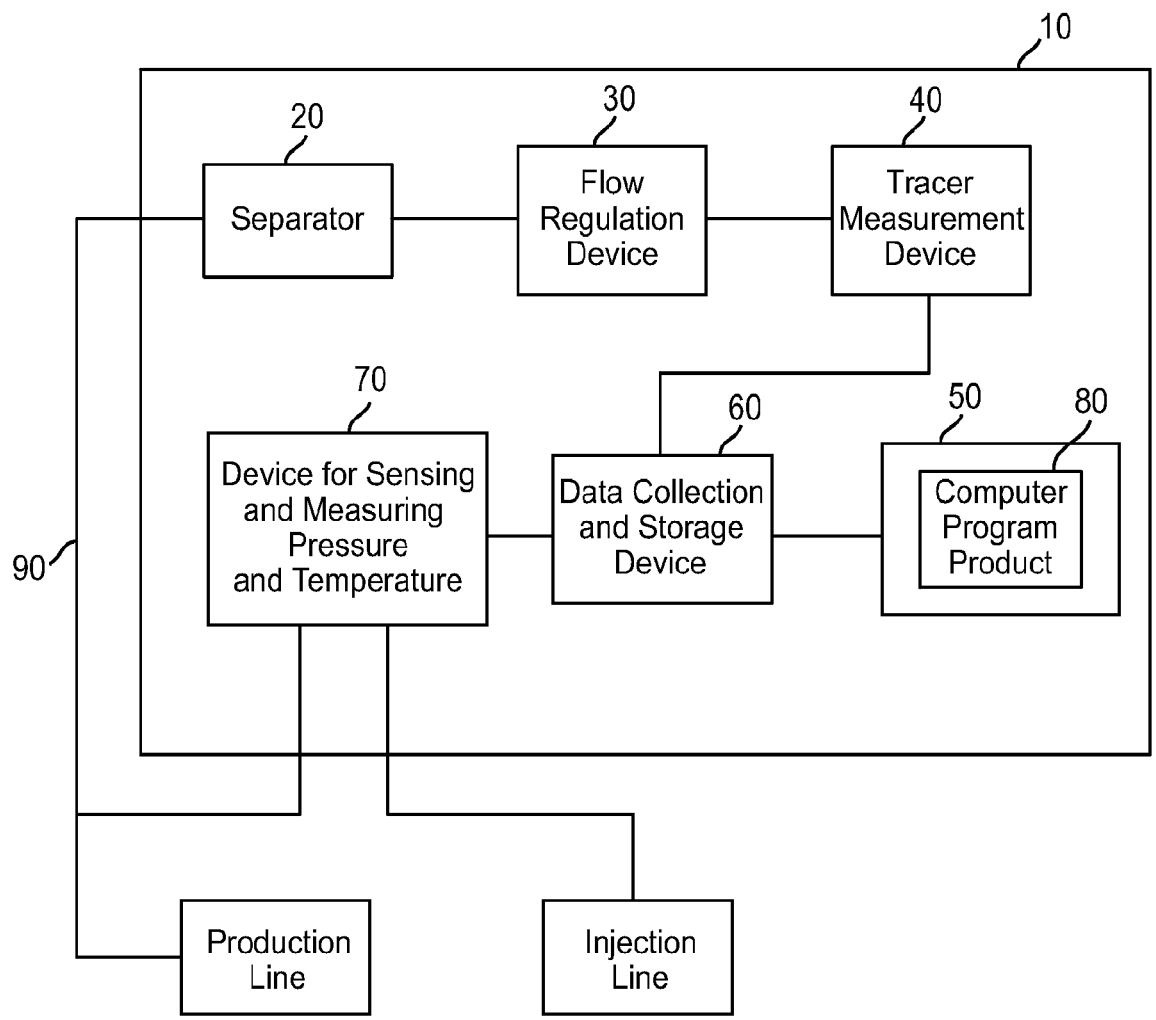
FIG. 1 is a schematic depiction of a gas lift well surveillance kit in accordance with one or more embodiments of the invention.

FIG. 1 depicts a gas lift well surveillance kit 10 in accordance with one or more embodiments of the invention. The kit 10 includes components for evaluating the performance of a gas lift well. The components include a separator 20, a flow regulation device 30, a tracer measurement device 40, a data collection and storage device 60, a device for sensing and measuring one or parameters, such as, pressure and temperature 70, and a computer program product 80 embodied on a computer-readable medium.

The separator 20 is configured to separate a gaseous phase from other phases that may be present in a mixture retrieved from a production reservoir via production tubing. Fluid that is retrieved from a production reservoir may include solid particles such as pieces of the rock formation. Also, in addition to lift gas that is present in the annulus of a well and that may have entered the production tubing, other gases present in the reservoir and/or rock formation may be present in the retrieved mixture. In addition, various liquids, including a desired production liquid, may be present in the retrieved mixture.

In one or more embodiments of the invention, a sample stream 90 is removed from a production stream that may include a multi-phase mixture retrieved from the reservoir through the production tubing. The sample stream 90 is removed from the production stream through a connection to the production line. The separator 20 may act on the sample stream 90 to separate a gaseous phase from other phases present in the mixture retrieved from the reservoir. After the separator 20 separates out the gaseous phase from the sample stream 90, the gaseous phase travels through the flow regulation device 30 which controls a flow rate of the gaseous phase into the tracer measurement device 40.

The tracer measurement device 40 continuously monitors and analyzes the gaseous phase for the presence of a tracer. The gaseous phase may include a mixture of one or more gases. The tracer may be a compound supplied from a tracer supply source into the annulus of a gas lift well. The tracer travels along with a lift gas that has been injected into the annulus and enters the production tubing at points of entry of the lift gas into the production tubing.

In one or more embodiments of the invention, the tracer employed may be carbon dioxide. The tracer measurement device 40 may be a spectrometer, such as an IR spectrometer capable of measuring a concentration of the tracer present in a retrieved substance. An IR spectrometer functions by bombarding a sample with electromagnetic radiation in the infrared range of the electromagnetic spectrum and determining a transmittance and absorption spectrum for the sample. A compound will absorb infrared light having a frequency that coincides with a natural resonant vibrational frequency of a molecular bond contained within the compound. Various compounds present in the sample will absorb infrared radiation at different wavelengths, thereby permitting identification of the compounds present in the sample. Based on the absorption spectrum produced by the IR spectrometer, a concentration of compounds present in the sample can also be quantified. Thus, the IR spectrometer may be used to measure the concentration of carbon dioxide present in the gaseous phase that is separated out from the sample stream 90 removed from the production stream. Alternatively, the tracer measurement device 40 may be any device known the in art for measuring the concentration of a substance. For example, the tracer measurement device 40 may be a UV spectrometer. Alternatively, the tracer employed may be a compound that, when present within a mixture, alters the pH of the mixture in a detectable manner. If such a tracer is used, the tracer measurement device may be a pH meter. The pH meter may determine concentration of the tracer present in the mixture based on changes in the measured pH. In the alternative, the tracer measurement device 40 may be any device capable of measuring the concentration of a tracer compound present in a multi-phase mixture (in situ measurement), thereby obviating the need for the separator 20.

The computer program product 80 embodied on the computer-readable medium is configured to analyze test data acquired by the data collection and storage device 60 during a well test. The computer program product 80 is configured to provide gas lift analysis, design, prediction and optimization using one or more of the following techniques: complex injection pressure models to determine velocities in the annulus, multi-phase pressure models to determine velocities in the production tubing, and well history data for comparison over time and archiving. The data collection and storage device 60 may be a datalogger, or any other data collection and storage device known in the art. The computer program product 80 is configured to analyze the test data and provide a highly accurate assessment of the presence and depths of one or more points of entry of a lift gas from into production tubing. The computer program product 80 may be executed on a computing device 50, which may be a personal computer, at the site of testing and production. Although the computing device 50 is shown as an element of the kit 10, this is not required. That is, the computing device 50 may be provided separately from the kit 10.

Additionally, data acquired by the data collection and storage device 60 may be analyzed off-site. For example, the computing device 50 may include network communication means (not shown) for transmitting data to an off-site location. Alternatively, data collected by the data collection and storage device 60 may be transferred to another storage device (not shown) for analysis at a later time off-site. Further, the data collection and storage device 60 may be provided with a means to communicate with and transfer test data to the computing device 50 on which the computer program product 80 is being executed such that the computer program product 80 may perform analysis of the data. It is important to note that it is not necessary for the computing device 50 to be connected to the gas lift well surveillance kit 10, specifically the data collection and storage device 60, during testing and acquisition of test data. The computing device 50 may be connected to the gas lift well surveillance kit 10 after testing is complete as data acquired by the data collection and storage device 60 can be retrieved and analyzed at a later time by the computing device 50. After data acquired by the data collection and storage device 60 during a test is analyzed and interpreted, the data may be erased (i.e. the data collection and storage device 60 may be reset) in order to perform additional tests.

In one or more embodiments of the invention, the device for sensing and measuring pressure and temperature 70 may be a pressure/temperature transducer. The device for sensing and measuring pressure and temperature 70 may be utilized to sense and measure temperature and pressure within the sample stream 90 as well as within an injection line through which the tracer is injected into the annulus of the gas lift well via a connection to the injection line.

In one or more embodiments of the invention, the gas lift well surveillance kit 10 may further include at least one power source, at least one analog pressure gauge, and piping or tubing for connecting the gas lift well surveillance kit to a gas lift well. Additionally, the gas lift well surveillance kit 10 may further include a digital scale to ensure that a desired amount of tracer is injected into the well. Further, in one or more embodiments of the invention, the gas lift well surveillance kit 10 requires only one temporary connection point on the lift gas injection line and one connection point on the production line.

In one or more embodiments of the invention, the gas lift well surveillance kit 10 may further include liquid carbon dioxide cylinders or bottles, and additionally may include high pressure nitrogen bottles. Carbon dioxide contained in the carbon dioxide cylinders is injected into the annulus and serves as the tracer. However, carbon dioxide cylinders typically do not have sufficient pressure to overcome the injection pressure of the gas lift well. The high pressure nitrogen bottles may be used to over-pressurize the carbon dioxide cylinders, thereby overcoming the injection pressure of the well and allowing the carbon dioxide to be injected into the annulus.

In one or more embodiments of the invention, the gas lift well surveillance kit 10 is compact and portable. For example, in an embodiment of the invention, the gas lift well surveillance kit weighs less than 150 lbs and has physical dimensions of approximately 18".times.18".times.18" or other dimensions representing a similar area. The gas lift well surveillance kit may be located inside or outside of the wellhead safe zone by fifty (50) foot or longer stainless steel hoses.

In one or more embodiments of the invention, the gas lift well surveillance kit 10 obviates the need for stopping production of the well during troubleshooting. Further, the gas lift well surveillance kit 10 according to one or more embodiments of the invention is safe to operate because no tools are introduced into the well bore. Moreover, because the determination of points of entry of the lift gas into the production tubing is related to surface casing pressure and lift-gas rate measurements, the kit 10 is suitable for situations in which pressure surveys are not feasible.

Figure 2A:
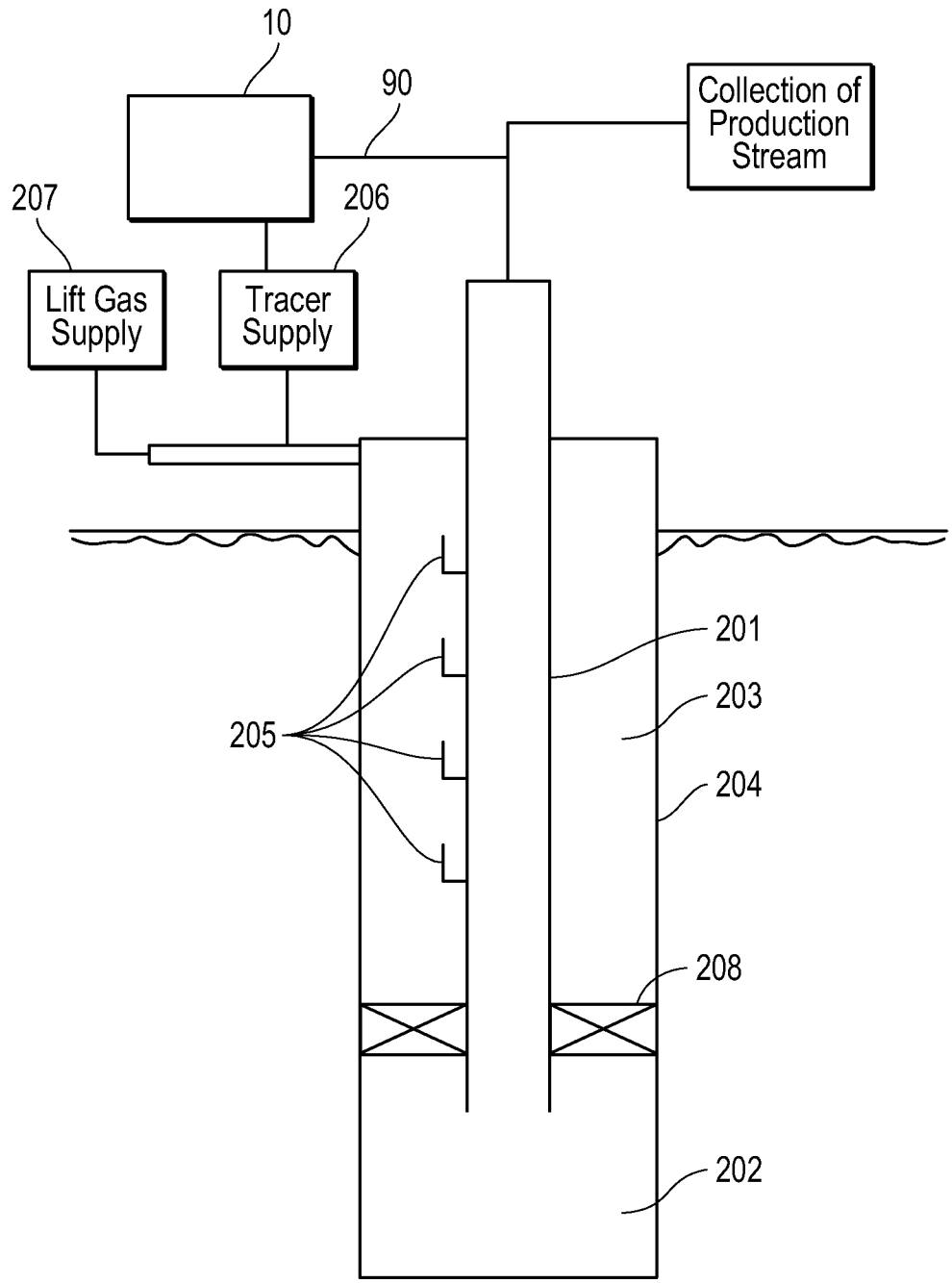
FIG. 2A is a schematic depiction of a gas lift well surveillance kit in accordance with one or more embodiments of the invention shown connected to a single completion gas lift well.

FIG. 2A is a schematic depiction of the gas lift surveillance kit 10 of FIG. 1 connected to a single completion gas lift well. The single completion gas lift well includes production tubing 201 that extends from at or above a ground surface to a depth within a reservoir 202. The reservoir 202 contains one or more fluids that are to be retrieved through the production tubing 201. The gas lift well depicted in FIG. 2A is a tubular flow well configuration in which lift gas is supplied from a lift gas supply source 207 into an annulus 203 formed between a well casing 204 and the production tubing 201, and one or more fluids are retrieved from the reservoir 202 via the production tubing 201. However, as previously noted, the gas lift well surveillance kit 10 in accordance with one or more embodiments of the invention may be used in connection with other types of gas lift wells including concentric flow (casing flow) wells and multiple installation gas lift wells (wells that have two or more production tubings that share a common annulus).

Still referring to FIG. 2A, lift gas is supplied to the annulus 203 by the lift gas supply 207. Lift gas occupies the annulus 203 and may enter the production tubing 201 through gas lift valves 205 disposed along the production tubing 201 and/or through leaks present in the production tubing 201. The lift gas aids in bringing one or more substances from the reservoir 202 to the surface. Further, a tracer is supplied into the annulus 203 by a tracer supply source 206. The tracer may be carbon dioxide. Alternately, the tracer may be any compound or combination of compounds that is capable of detection and whose concentration is capable of being measured in a substance retrieved from the gas lift well. The tracer may enter the production tubing 201 through one or more of the gas lift valves 205 and/or through leaks in the production tubing 201.

Containers of high pressure nitrogen gas may be used to increase the pressure of the carbon dioxide supplied by the tracer supply source 206, if necessary to overcome an injection pressure of the gas lift well. A packer 208 is optionally formed within the well casing 204 to isolate the production tubing 201 from the annulus 203.

Still referring to FIG. 2A, gas lift mandrels having gas lift valves 205 operatively connected thereto are disposed along the production tubing 201. Variation in tubing and casing pressures causes the gas lift valves 205 to open and close, thereby allowing the lift gas to be injected into the production tubing 201.

The gas lift well surveillance kit 10 may be connected to the production tubing 201 in order to obtain the sample stream 90 from the production stream for testing and analysis. More specifically, the gas lift well surveillance kit 10 may be connected via tubing to a wellhead tree disposed on a top portion of the production tubing 201 in order to provide a continuous sample stream 90 of the production stream to the kit 10 for analysis. Further, the connection of the kit 10 to the tracer supply source 206 allows the device for sensing and measuring pressure and temperature to monitor the pressure and temperature within the injection line through which tracer is supplied from the tracer supply source 206.

Figure 2B:
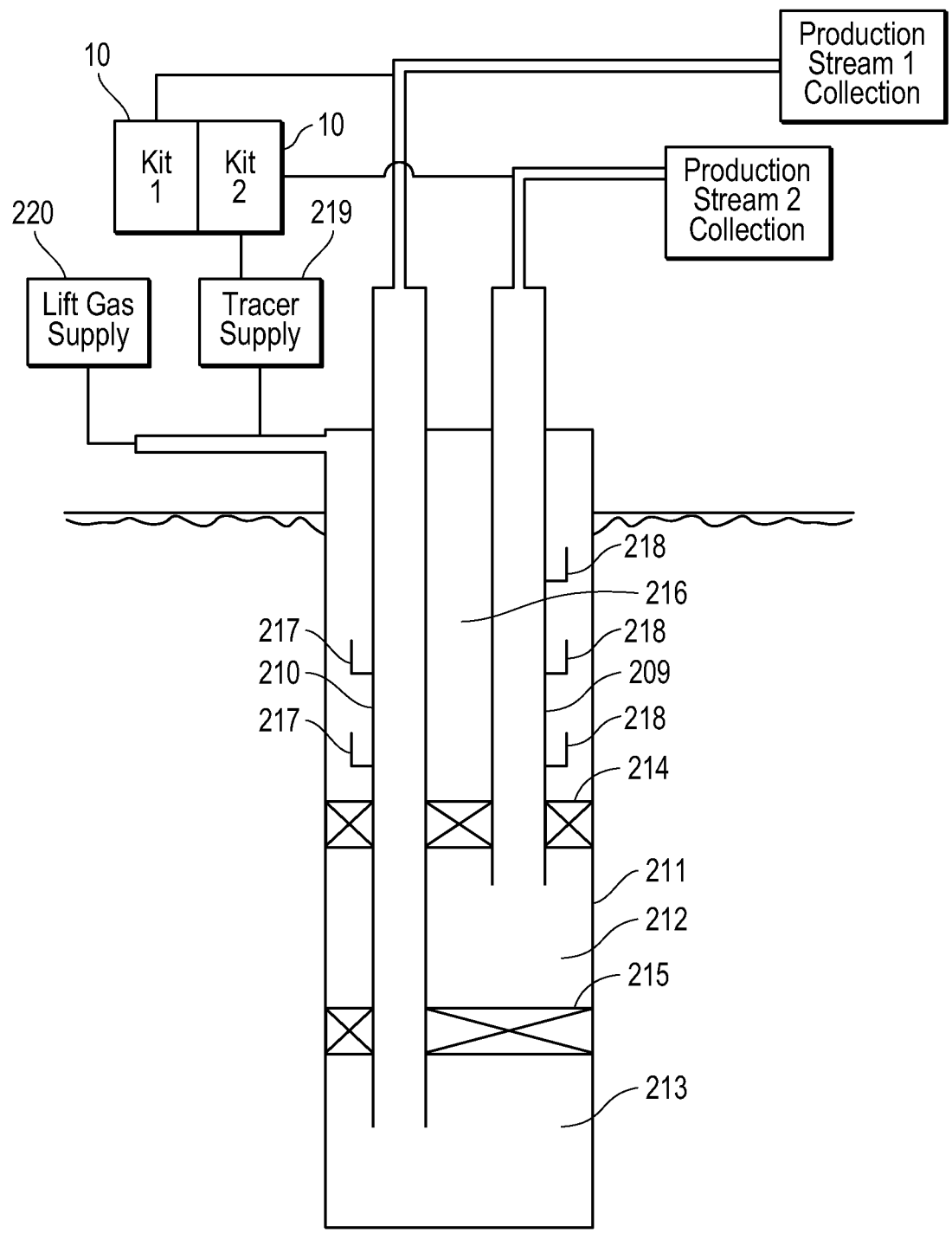
FIG. 2B is a schematic depiction of a gas lift well surveillance kit in accordance with one or more embodiments of the invention shown connected to a dual completion gas lift well.

FIG. 2B is a schematic depiction of the gas lift well surveillance kit 10 in accordance with one or more embodiments of the invention connected to a dual completion gas lift well. Although the description that follows will be presented with reference to a dual completion gas lift well, the invention is not limited to such a well, and a gas lift well surveillance kit in accordance with one or more embodiments of the invention may be used in connection with a multiple installation well of any configuration known in the art.

The dual completion gas lift well includes two production tubings 209, 210 disposed within a well casing 211. One production tubing 209 (hereinafter "short string") extends from at or above a ground surface to a depth within a first reservoir 212. The other production tubing 210 (hereinafter "long string") extends from at or above a ground surface to a depth within a second reservoir 213. Two packers 214, 215 are used to isolate the two reservoirs 212, 213. A dual packer 214 is provided that includes two bores through which the short string 209 and the long string 210 extend. A single packer 215 is provided that includes a single bore through which the long string 210 extends. Together, the two packers 214, 215 serve to isolate one production reservoir from the other, and thus serve to isolate the short string 209 from the long string 210. As a result, the short string 209 and the long string 210 are substantially incapable of fluid communication with each other. Such a design maintains the integrity of the two production streams generated from reservoirs 212, 213.

Gas lift mandrels having gas lift valves 217 operatively connected thereto are disposed at positions along the long string 210. Similarly, gas lift mandrels having gas lift valves 218 operatively connected thereto are disposed at positions along the short string 209. The short string 209 and the long string 210 share a common annulus 216. That is, the short string 209 and the long string 210 are each capable of potential fluid communication with the annulus (through their respective gas lift valves 218, 217).

Similarly to FIG. 2A, lift gas is supplied to the annulus 216 by the lift gas supply source 220. Lift gas occupies the annulus 216 and may enter the short string 209 and/or the long string 210 through one or more of their respective gas lift valves 218, 217 and/or through leaks present in either string. The lift gas aids in bringing one or more substances from reservoirs 212, 213 to the surface. Further, a tracer is supplied into the annulus 216 by a tracer supply source 219. The tracer may be carbon dioxide. Alternately, the tracer may be any compound or combination of compounds that is capable of detection and whose concentration is capable of being measured in a substance retrieved from the gas lift well. The tracer may enter (along with the lift gas) the short string 209 and/or the long string 210 through one or more of their respective gas lift valves 218, 217 and/or through leaks in either string.

Two gas lift well surveillance kits 10 in accordance with one or more embodiments of the invention are shown connected to components of the dual completion well in FIG. 2B. It is not necessary that the two kits include the same number and type of components. A sample stream is generated from production stream 1 (which includes one or more fluids produced from reservoir 213). The sample stream is fed to Kit 1 which analyzes the sample stream in the manner described earlier, and which will be described in further detail hereinafter. Similarly, a sample stream is generated from production stream 2 (which includes one or more fluids produced from reservoir 212). This sample stream is fed to Kit 2 which then analyzes the sample stream in the manner described earlier, and which will be described in further detail hereinafter.

One or more embodiments of the invention include computer-implemented methods described in greater detail below. In various embodiments, methods of the invention may be carried out entirely on one apparatus or computing device. Alternatively, portions of the methods may be carried out on two or more computers connected by a network or a network device connecting the computers. The order of method elements as described herein does not necessarily limit the order in which the elements can be performed.

One or more embodiments of the invention may be implemented partially, or in whole, as software modules installed and running on one or more data processing systems ('computers'), such as servers, workstations, tablet computers, PCs, personal digital assistants ('PDAs'), smart phones, and so on. The computer includes at least one computer processor as well as a computer memory, including both volatile random access memory ('RAM') and some form or forms of non-volatile computer memory such as a hard disk drive, an optical disk drive, or an electrically erasable programmable read-only memory space (also known as 'EEPROM' or 'Flash' memory). The computer memory is connected through a system bus to the processor and to other system components. Thus, the software modules are program instructions stored in computer memory.

An operating system is stored in the computer memory. The operating system may be any appropriate operating system such as Windows 98, Windows NT 4.0, Windows 2000, Windows XP, Windows Vista, Windows 7, Windows 8, Mac OS X, UNIX, LINUX, or AIX from International Business Machines Corporation. A network stack may also be stored in memory. The network stack is a software implementation of cooperating computer networking protocols to facilitate network communications.

The computer may also include one or more input/output interface adapters. Input/output interface adapters may implement user-oriented input/output through software drivers and computer hardware for controlling output to output devices such as computer display screens, as well as user input from input devices, such as keyboards and mice.

Figure 3:
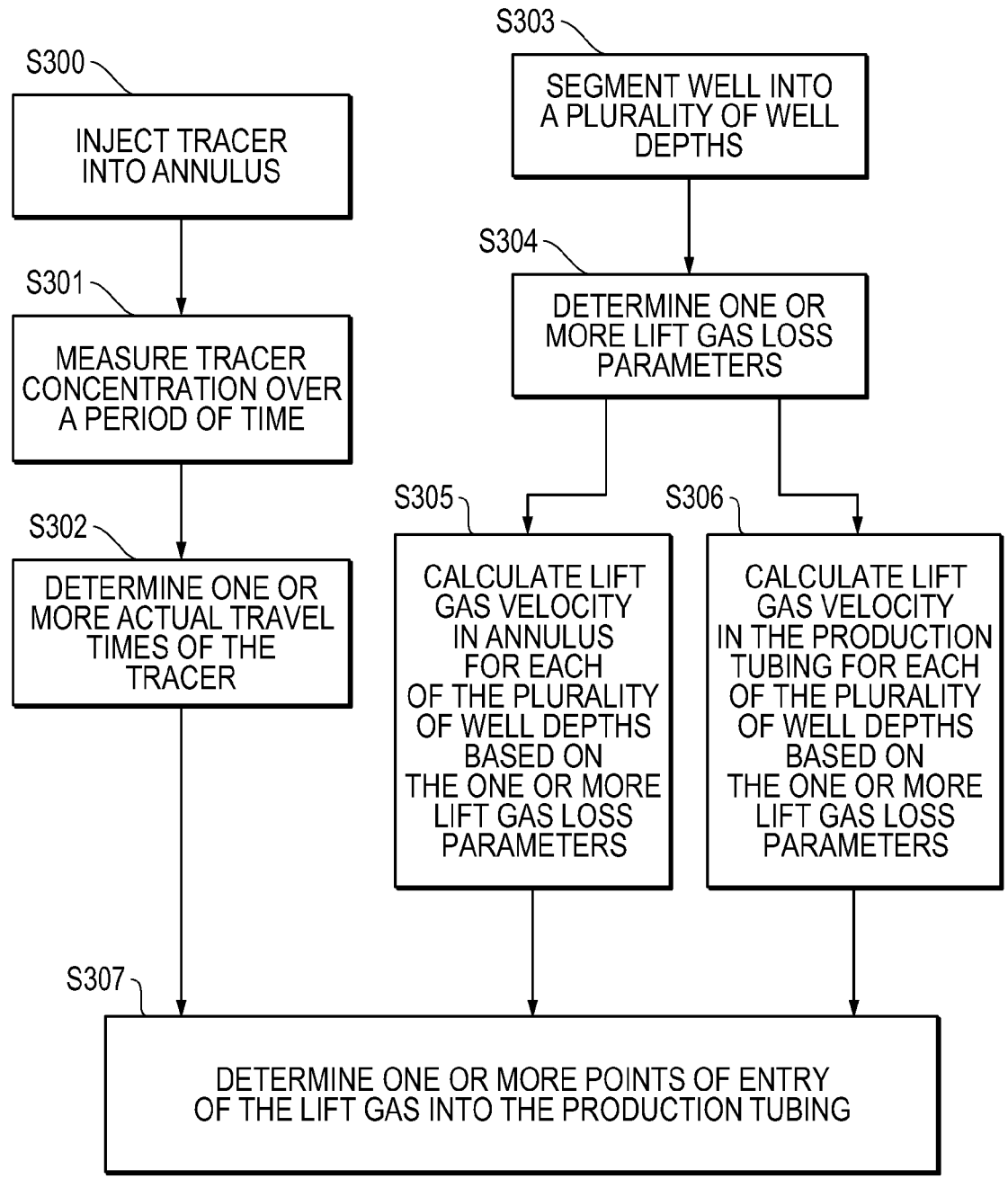
FIG. 3 depicts a flowchart illustrating a method for evaluating the performance of a gas lift well in accordance with one or more embodiments of the invention.

FIG. 3 depicts a flow chart illustrating a method for evaluating the performance of a gas lift well in accordance with one or more embodiments of the invention. In step S300 of the method illustrated in FIG. 3, an amount of tracer is injected into the annulus of a gas lift well through an injection line. As described earlier, the tracer may be carbon dioxide. The tracer may be supplied from a tracer supply source that includes one or more containers of carbon dioxide accompanied by one or more containers of nitrogen to over-pressurize the carbon dioxide in order to overcome an injection pressure of the gas lift well.

The tracer may be supplied to the annulus of a well in liquid phase. For example, the tracer supply source may include containers of liquid carbon dioxide that are pressurized to at least a minimum pressure required to maintain the carbon dioxide in a liquid phase. The liquefied carbon dioxide rapidly converts to a gaseous phase upon injection into the annulus. Due to the high compressibility of carbon dioxide, a relatively small volume of liquefied carbon dioxide converts to a relatively large volume of gaseous carbon dioxide upon injection into the annulus. Therefore, injecting liquid phase carbon dioxide is advantageous because a relatively small amount of injected carbon dioxide produces a relatively large volume of gaseous carbon dioxide which improves the accuracy of measurement results obtained by the tracer measurement device.

Further, as previously described, a gas well surveillance kit according to one or more embodiments of the invention that is used to perform the method illustrated in FIG. 3 may include a digital scale to precisely control the amount of tracer introduced into the annulus. In addition, a gas lift well surveillance kit in accordance with one or more embodiments of the invention includes a device for sensing and measuring pressure and temperature within the injection line through which the tracer is injected in the annulus. The amount of tracer injected into the annulus and the rate of tracer injection may be controlled based on measurements obtained by the device for sensing and measuring pressure and temperature.

Upon injecting the tracer into the annulus of the gas lift well, in step S301, the concentration of the tracer is measured in a sample stream obtained from a production stream of the gas lift well. As described earlier, a gas lift well surveillance kit in accordance with one or more embodiments of the invention includes a separator that is configured to separate out a gaseous phase from a multi-phase sample stream. The gaseous phase is monitored for the presence of the tracer. Tracer that is injected into the annulus of the gas lift well will enter the production tubing at any point that the lift gas contained within the annulus enters the production tubing (e.g. through gas lift valves positioned along the production tubing and/or leaks in the production tubing).

A gas lift well surveillance kit in accordance with one or more embodiments of the invention includes a tracer measurement device that measures, over a period of time, the concentration of the tracer present in, for example, a gaseous phase that has been separated from a sample stream obtained from a production stream. The duration of the tracer measurement depends on the physical characteristics of the well surveyed and can range from 60 minutes to 12 or more hours. Typical tracer return times are between 1 hour and 7 hours.

In step S301, the tracer measurement device may measure an initial baseline concentration of tracer present in the gaseous phase separated from the sample stream. The baseline tracer concentration may refer to the concentration of a certain initial amount of tracer that is present in the production stream prior to any of the injected tracer entering the production tubing For example, the tracer measurement device may detect small, random fluctuations in the concentration of the tracer measured in produced reservoir fluid. These fluctuations may be indicative of a baseline tracer concentration present in the produced fluid or measurement error.

The baseline tracer concentration may vary in a non-periodic manner, or may remain substantially constant. Alternately, the baseline tracer concentration may oscillate periodically. For example, the baseline tracer concentration may oscillate sinusoidally, or with any other periodicity. Periodic oscillation of the baseline tracer concentration may be due to a repeating variation in casing and/or tubing pressures that causes one or more gas lift valves to open and close in a periodic manner.

Figure 7A:
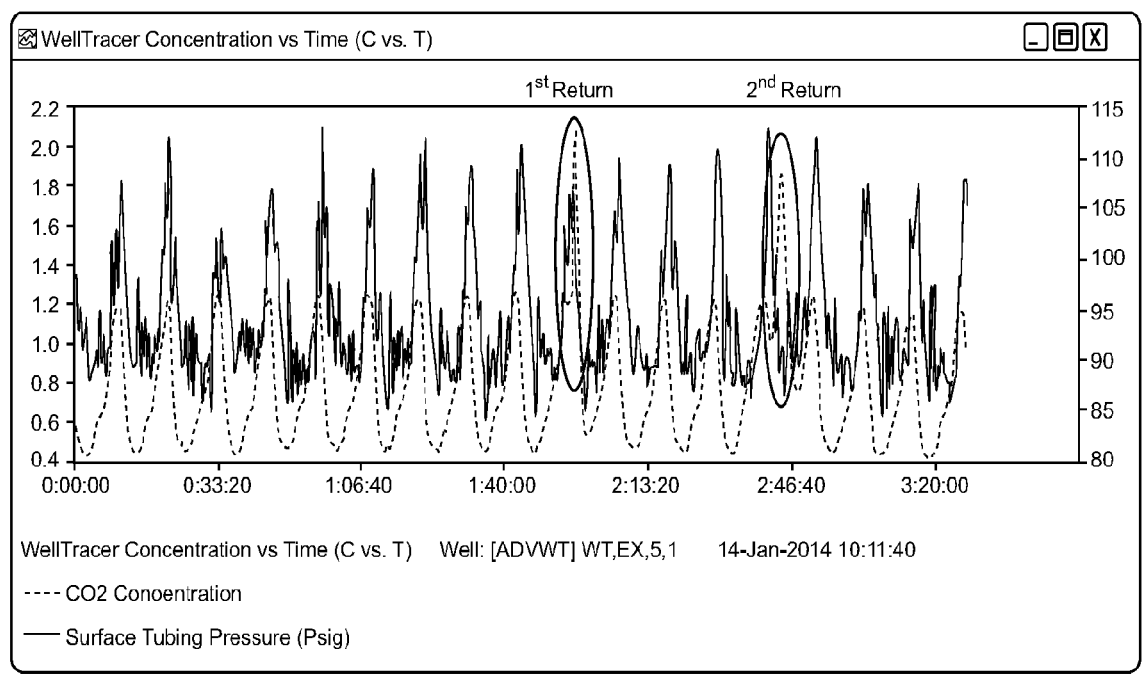
FIGS. 7A and 7C depict sample graphical representations of raw data in accordance with one or more embodiments of the invention.

Instability in the baseline tracer concentration can, however, make it difficult to determine the concentration or even the existence of the tracer in the returns (that is, in the substance retrieved from the gas lift well) or returns data. FIG. 7A shows a baseline tracer concentration. As seen in FIG. 7A, the baseline tracer data is not stable. It can be, therefore, difficult to impossible to analyze actual tracer returns data by independently reviewing the baseline tracer data shown in FIG. 7A. One or more embodiments of the invention involve a method for facilitating enhanced identification of tracer returns when the baseline tracer data reveals the presence of noise or instability.

The method involves adjusting or correcting the tracer returns data using one or more known principles of signal processing. As is known, signal processing involves analysis of signals of interest. The signal of interest can include, for example, sensor readings obtained by a device measuring the tracer returns data. Adjustment of the tracer returns data can enable the capturing of vital patterns while substantially eliminating noise, aberrations and other instability in the tracer returns data. Therefore, the adjustment of the tracer returns data can facilitate substantially more accurate identification of actual or real tracer returns data.

A computer program can be used to implement one or more custom signal processing algorithms on the tracer returns data. The algorithms can involve one or more operations such as data smoothing, filtering and time-frequency analysis on the tracer returns data.

The method further includes relating the adjusted tracer returns data to one or more key well parameter data. In one or more embodiments of the invention, the gas lift well surveillance kit, as described earlier, can be used to record key well parameter data during a preliminary well survey. The key well parameters include one or more parameters used to calculated lift gas velocities in the annulus and in the production tubing. The key well parameters can include one or more of injection rate, casing mechanical layout, injection pressure, injection temperature, lift gas specific gravity, total produced liquid rate, water cut, formation gas rate, tubing head pressure (THP), casing head pressure (CHP), production separator pressure, production manifold pressure, and tracer concentration. Other information include mechanical data that includes tubing string, casing string and flowline information, installed mandrels and valves, lift gas properties, reservoir data, well test data, deviation data, and current gradient surveys. Information captured during the preliminary well survey and SCADA data enable the accurate calculation of lift gas velocities in the annulus and in the production tubing, and thus, enable analysis of tracer return results with little to no calibration required.

The method further includes analyzing the adjusted tracer returns data and the key well parameter data using one or more advanced techniques involving non-linear data. For example, a computer program can be used to plot the adjusted tracer return data and the key well parameter data in a multi-dimensional time dependent "chaos" plot or a recurrence plot to generate a pattern.

The method also includes displaying or visualizing a generated pattern formed by plotting the data in, preferably, three or four-dimensions in order to expose actual tracer returns data. The pattern can be displayed on a Web client or on a user/operator desktop. The pattern may be a "chaotic" pattern and can be described as a fractal. Fractals are geometric patterns that are repeated at ever smaller scales to produce irregular shapes and surfaces that cannot be represented by classical geometry.

The method further includes visually inspecting the generated fractal to determine actual tracer returns. Alternately, the method may include analyzing the generated fractal using a computer program in order to determine actual tracer returns.

Figure 7B:
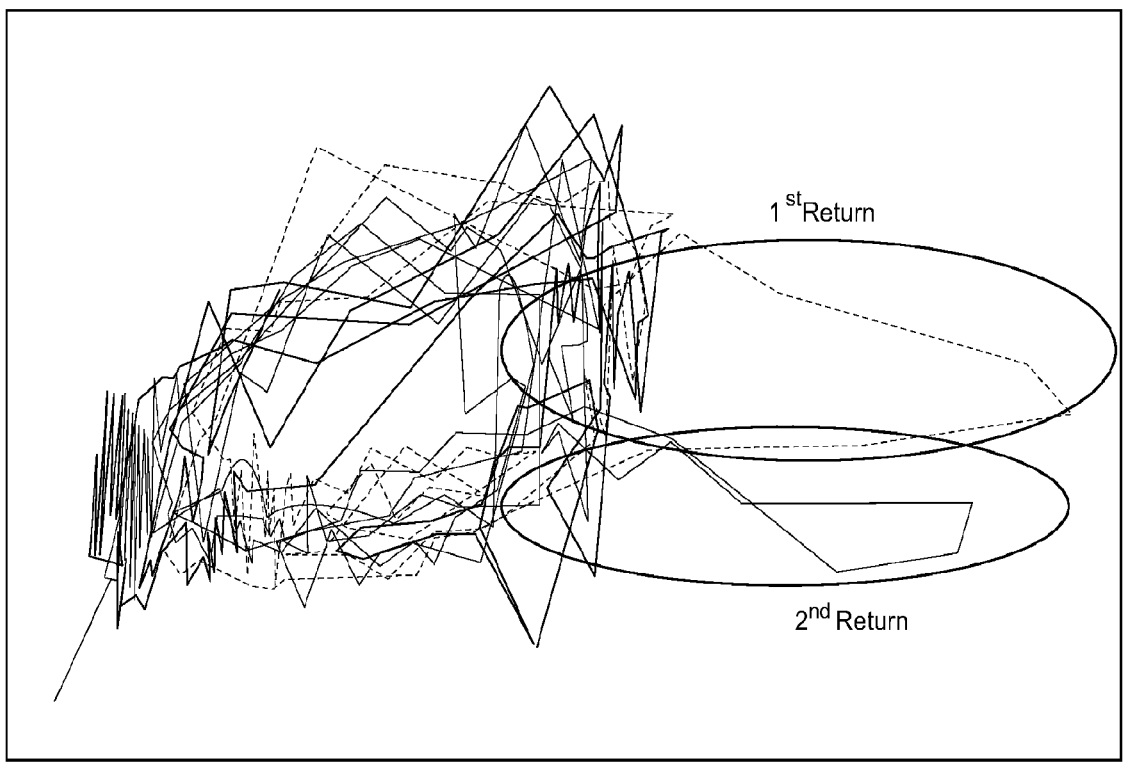
FIGS. 7B and 7D depict sample fractals in accordance with one or more embodiments of the invention.

For example, in reviewing FIG. 7A, it can be seen that tubing head pressure appears to swing with the baseline tracer concentration. Therefore, raw or actual tracer returns data can be adjusted to remove noise or instability. The adjusted tracer returns data and key well parameters, such as, THP and injection pressure can be plotted in a multi-dimensional plot over time. The resultant fractal is displayed in FIG. 7B. FIG. 7B provides a quick and efficient means for determining that there are four tracer returns.

Figure 7C:
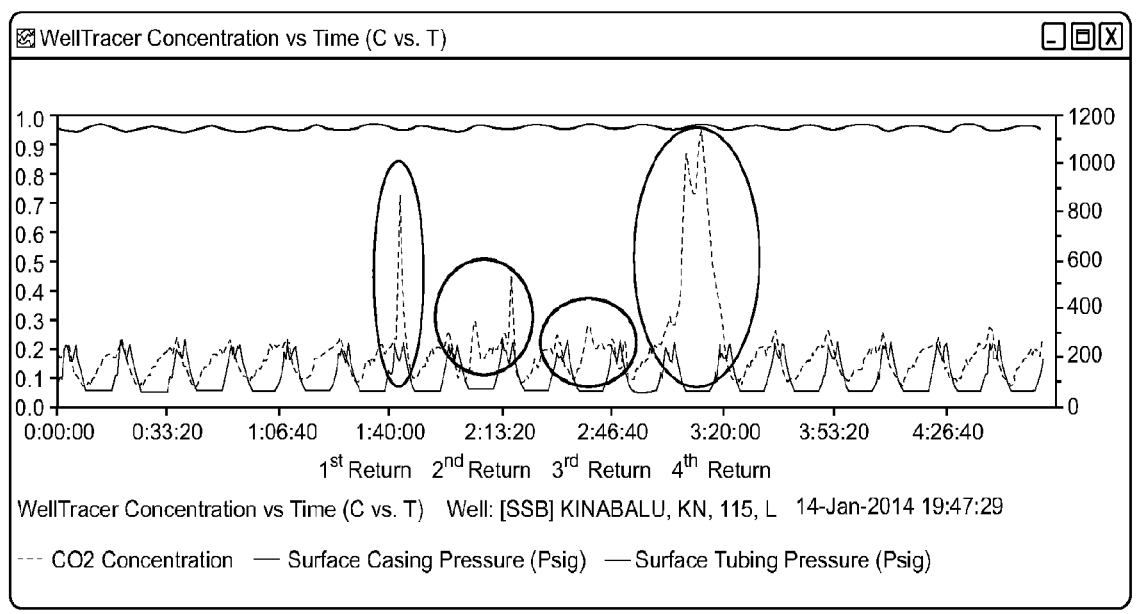
Figure 7D:
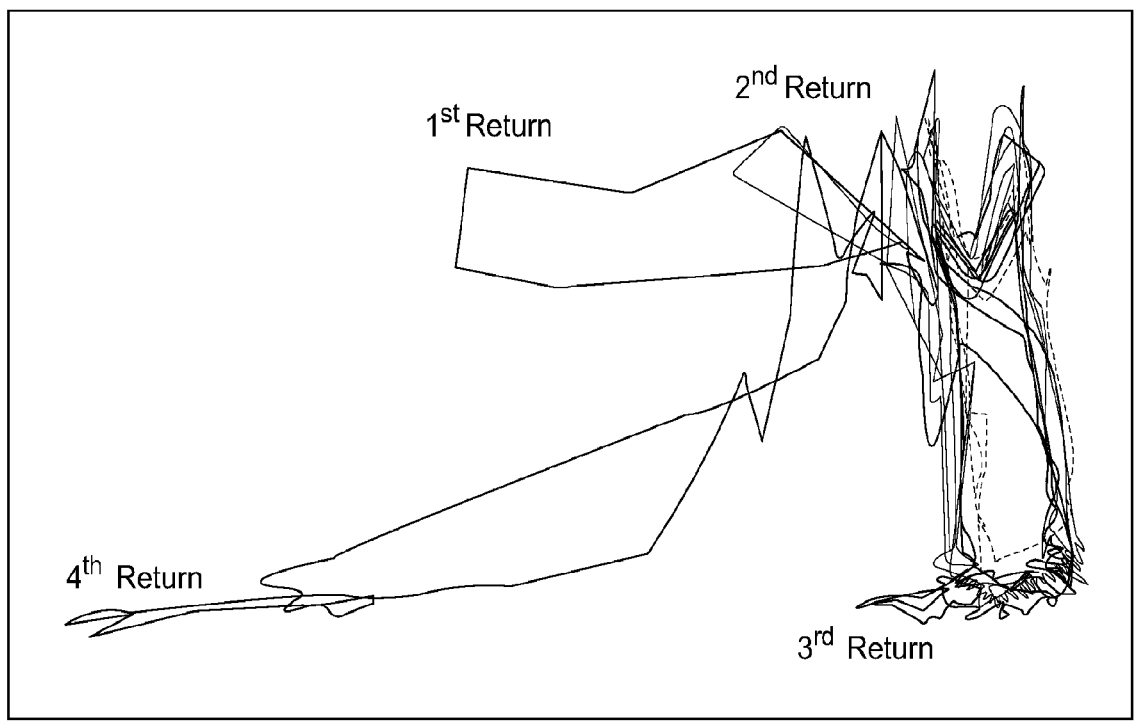

Similarly, the baseline tracer concentration is not stable in FIG. 7C. It can be difficult to impossible to determine actual tracer returns data by reviewing the tracer trend in FIG. 7C independently. As is shown in FIG. 7C, the THP and CHP appear to swing with the baseline tracer concentration. Therefore, raw or actual tracer returns data can be adjusted to remove noise or instability. The adjusted tracer returns data and key well parameters, such as, injection pressure, THP and tracer concentration can be plotted in a multi-dimensional plot over time. The resultant fractal is displayed in FIG. 7D. FIG. 7D provides a quick and efficient means for determining that there are five tracer returns.

According to another embodiment, a method for identifying problems with key well parameter data includes adjusting one or more key well parameter data and analyzing the adjusted data using multi-dimensional time dependent plots. Key well parameters have been described earlier. According to this method, problems with data or information on key well parameters can be quickly identified on a substantially real-time basis. This method can also facilitate an enhanced understanding of the gas lift well.

The method includes collecting data on a plurality of key well parameters on a real-time basis. For example, the data can be collected using the gas lift well surveillance kit, as described earlier. The method further includes adjusting or correcting, on a substantially real-time basis, the collected key well parameter data when the collected data reveals the presence of noise or other aberrations. The collected data can be adjusted using one or more known principles of signal processing. As is known, signal processing involves analysis of signals of interest. The signal of interest can include, for example, sensor readings obtained by a device measuring the key well parameter data. Adjustment of key well parameter data can substantially eliminate noise, aberrations and other instability in the key well parameter data. A computer program can be used to implement one or more custom signal processing algorithms on the collected data. The algorithms can involve one or more operations such as data smoothing, filtering and time-frequency analysis on the key well parameter data.

The method further includes analyzing the adjusted key well parameter data using one or more advanced techniques involving non-linear data. For example, a computer program can be used to plot the adjusted key well parameter data in a multi-dimensional time dependent "chaos" plot or a recurrence plot to generate a pattern. In this manner, a plurality of key well parameters can be related on a single plot in a particular manner that has not been commonly employed in the art.

The method also includes displaying or visualizing the generated pattern formed by plotting the key well parameter data in, preferably, three or four-dimensions in order to expose actual tracer returns data. The pattern can be displayed on a Web client or on a user/operator desktop. The "chaotic" pattern may be a fractal, as described earlier. The method further includes visually inspecting the fractal to determine the presence of one or more clusters or groupings and to determine if one or more of the key well parameter data appears to be outside a predetermined normal range.

The graphing engine may be used, for example, in conducting a WellTracer® analysis by AppSmiths WellTracer, LLC. of Katy, Tex. WellTracer® is a non-invasive method to determine downhole conditions, and in particular, it can be used to find the lift point, see if the well is multi-pointing and to identify leaks from the casing into the tubing. The graphing engine may be incorporated into the WinGLUE® product suite deployed by AppSmiths Software, LLC.

In step S302 of the method of the invention illustrated in FIG. 3, one or more actual travel times of the tracer are determined. An actual travel time of the tracer corresponds to a deviation in the measured concentration of the tracer over the period of time from a pattern present in the baseline concentration of the tracer. The term "pattern" as used herein with reference to the baseline tracer concentration refers to any concentration of tracer that is not indicative of an actual travel time of tracer. An actual travel time of the tracer refers to a duration corresponding to the time required for injected tracer to travel from the injection point, down the annulus, through an operating valve or leak in the production tubing, and return to a measurement point. The term "pattern" should not be construed to require any periodicity or regularity in the baseline tracer concentration. The term "pattern" merely refers to any characteristic of the baseline tracer concentration that identifies the baseline tracer concentration as such and distinguishes it from a tracer concentration that indicates an actual travel time of the tracer.

In step S303, the gas lift well that is being tested is segmented into a plurality of ranges of well depth. The depth of the well may be determined using any starting point and extending to any desired depth within the well. Determination of the well depth may vary based on the particular characteristics of the well surveyed. In an exemplary embodiment, well depth may be calculated from an injection point of the tracer to a depth within the well. The ranges of well depth into which the well is segmented may vary in size and may or may not overlap. Alternatively, some of the ranges of well depth may overlap while other ranges do not. In an embodiment of the invention, the well depth is segmented into a plurality of ranges of well depth that are substantially equal in size and do not overlap. For example, assuming a well depth of 4000 ft. the well may be segmented into 100 ranges of well depth, each range corresponding to 40 ft of well depth. It should be noted that the ranges of well depth will not be of equal size in an embodiment of the invention in which lift gas velocities are determined using integration. It should be noted that the segmentation of the well into a plurality of well depths (step S303) may occur prior to, concurrently with, or subsequent to any of steps S300-S302.

In step S304 of the method of the invention illustrated in FIG. 3, one or more lift gas loss parameters are determined. Each lift gas loss parameter can correspond to a particular point of entry of the lift gas into the production tubing and provides a measure of an effect of entry of a portion of the tracer into the corresponding point of entry on the actual travel time of the tracer that enters the production tubing at each point of entry that is located at a depth greater than the corresponding point of entry. Each lift gas loss parameter is determined based on the tracer concentration measured by the tracer measurement device. As noted above, a deviation in a pattern present in the baseline concentration of tracer indicates an actual travel time of tracer which, in turn, corresponds to a point of entry of tracer (and lift gas) into the production tubing.

When lift gas enters at a particular point of entry into the production tubing, the velocity of the lift gas in the annulus (and by extension the velocity of the tracer in the annulus) is reduced for any well depths below that point of entry. The extent to which the velocity is reduced is proportionate to the amount of lift gas that entered into the production tubing at that point of entry. In a similar manner, the velocity of the lift gas in the production tubing above the point of entry of the lift gas into the production tubing is increased proportionately to the amount of lift gas that entered the production tubing at that point of entry. As such, the lift gas loss parameter that corresponds to a particular point of entry provides a measure of the effect of entry of lift gas into the production tubing at that point of entry on the velocity of lift gas in the annulus at depths greater than the point of entry and the velocity of lift gas in the production tubing at shallower depths than the point of entry. The determination of the lift gas loss parameters will be described in greater detail later through reference to FIG. 5.

After a lift gas loss parameter has been determined for each point of entry of the lift gas into the production tubing, a velocity of the lift gas in the annulus is calculated, in step S305, for each of the plurality of ranges of well depth determined by the segmentation in step S303. The velocities of the lift gas in the annulus are calculated for the plurality of ranges of well depth based on the one or more lift gas loss parameters determined in step S304. Similarly, in step S306, a velocity of the lift gas in the production tubing is calculated for each of the plurality of ranges of well depth based on the one or more lift gas loss parameters determined in step S304. Steps S305 and S306 may be performed concurrently or with partial overlap. It should be noted that the size and number of ranges of well depth into which the well is segmented may not be the same for the annulus and the production tubing. Thus, as a velocity of the lift gas is calculated for each range of well depth, the number of discrete velocities calculated in the production tubing may differ from the number of discrete velocities calculated in the annulus.

In addition to the one or more lift gas loss parameters, one or more other parameters may be used to calculate the lift gas velocities in the annulus and/or in the production tubing. For example, in addition to the one or more lift gas loss parameters, one or more of the following well parameters may be used to determine the lift gas velocity in the annulus for each of the plurality of ranges of well depth: (i) a plurality of pressures in the annulus, each of the plurality of pressures corresponding to one of the plurality of ranges of well depth, (ii) a flow rate of the lift gas in the annulus, (iii) an injection pressure of the lift gas, (iv) a volume of the annulus per a unit of well depth, (v) a temperature in the annulus, (vii) a parameter that represents a frictional force opposing flow in the annulus, and (viii) a parameter that represents an effect of gravity on flow in the annulus. In calculating the velocity of the lift gas in the annulus for a particular range of well depth from among the plurality of ranges of well depth, one or more parameters listed above may be measured or determined specifically for that range of well depth. For example, if the velocity of the lift gas in the annulus were being determined for a range of well depth from 400-450 ft, a temperature in the annulus at this range of well depth, a pressure in the annulus at this range of well depth, a flow rate of the lift gas in the annulus across this range of well depth, and so on may be used. In this manner, a highly accurate calculation of the velocity of the lift gas in the annulus that is specific to each range of well depth is obtainable.

Similar to the calculation of velocities of the lift gas in the annulus, in addition to the one or more lift gas loss parameters, one or more of the following parameters may be used to calculate the velocity of the lift gas in the production tubing for each of the plurality of ranges of well depth: (i) a plurality of pressures in the production tubing, each of the plurality of pressures corresponding to one of the plurality of ranges of well depth, (ii) a flow rate of the lift gas in the production tubing, (iii) a temperature in the production tubing, (iv) a parameter that represents a frictional force opposing flow in the production tubing, (v) a parameter that represents an effect of gravity on flow in the production tubing, (vi) a ratio of a gaseous phase to a non-gaseous phase in the substance retrieved from the gas lift well, (vii) a flow rate of one or more gases present in the substance retrieved from the gas lift well, (viii) a flow rate of one of more liquids present in the substance retrieved from the gas lift well, (ix) a well head pressure, and (x) a separator pressure. In calculating the velocity of the lift gas in the production tubing for a particular range of well depth from among the plurality of ranges of well depth, one or more parameters listed above may be measured or determined specifically for that range of well depth. For example, if the velocity of the lift gas in the production were being determined for a range of well depth from 400-450 ft. a temperature in the production tubing at this range of well depth, a pressure in the production tubing at this range of well depth, a flow rate of the lift gas in the production tubing across this range of well depth, and so on may be used. In this manner, an accurate calculation of the velocity of the lift gas in the production tubing that is specific to each range of well depth is obtainable.

It should be noted that in addition to, or as an alternative to, the parameters listed above, other parameters may be used to determine the velocity of the lift gas in the annulus and/or the velocity of the lift gas in the production tubing for each of the plurality of ranges of well depth.

In one or more additional embodiments of the invention, the velocity of the lift gas in the annulus and/or the velocity of the lift gas in the production tubing may be calculated in a progressive or iterative manner. More specifically, for example, a velocity of the lift gas in the annulus that is calculated for a first range of well depth may be used as a parameter, potentially along with one or more other parameters, to determine a velocity of the lift gas in the annulus for a second range of well depth that immediately follows the first range of well depth. This manner of determining velocities may then proceed in an iterative fashion until the velocity for any given range of well depth in the annulus is determined based on a velocity calculated for a range of well depth that immediately precedes the given range of well depth.

Figure 4:
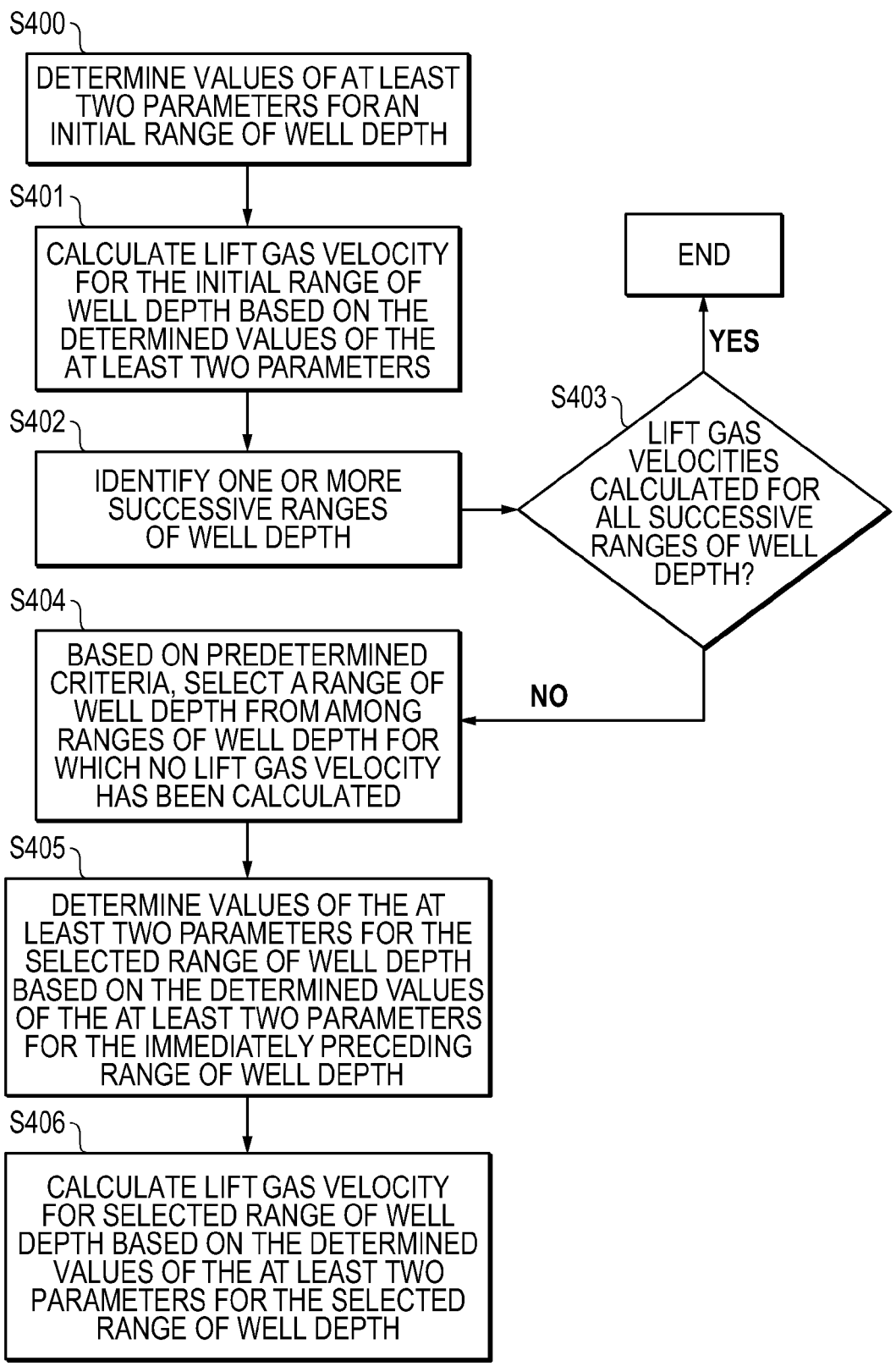
FIG. 4 depicts a flowchart illustrating a method in accordance with one or more embodiments of the invention.

The iterative calculation of velocities will be described in greater detail through reference to FIG. 4. FIG. 4 illustrates an iterative determination of velocities in the annulus or the production tubing in accordance with an embodiment of the invention. For simplicity, however, the method illustrated in FIG. 4 will be described with reference to calculating lift gas velocities in the annulus. In initial step S400, values of at least two parameters are determined for an initial range of well depth of the plurality of ranges of well depth. For example, the at least two parameters may include calculating velocity in the casing (or the injection string) and the velocity in the tubing (or the production string) Subsequently, in step S401, a velocity of the lift gas in the annulus is calculated for the initial range of well depth based on the determined values of the at least two parameters. For example, the lift gas velocity for the initial range of well depth may be calculated based on the velocity in injection string and the production string corresponding to the initial range. If the values of one or more additional parameters are determined, these values may additionally be used to determine the lift gas velocity in the annulus for the initial range of well depth. The initial range of well depth may be the range of well depth having the shallowest maximum well depth from among the plurality of ranges of well depth. The "well depth" of a particular point within a well, as used herein, refers to a distance from that point within the well to a measurement starting point. For example, the well depth of a particular point within a well may correspond to a distance from an injection point of the tracer to that point within the well. Alternatively, the measurement starting point for determining well depth may any point within the well or any point at or above the surface of the well.

Figure 8A:
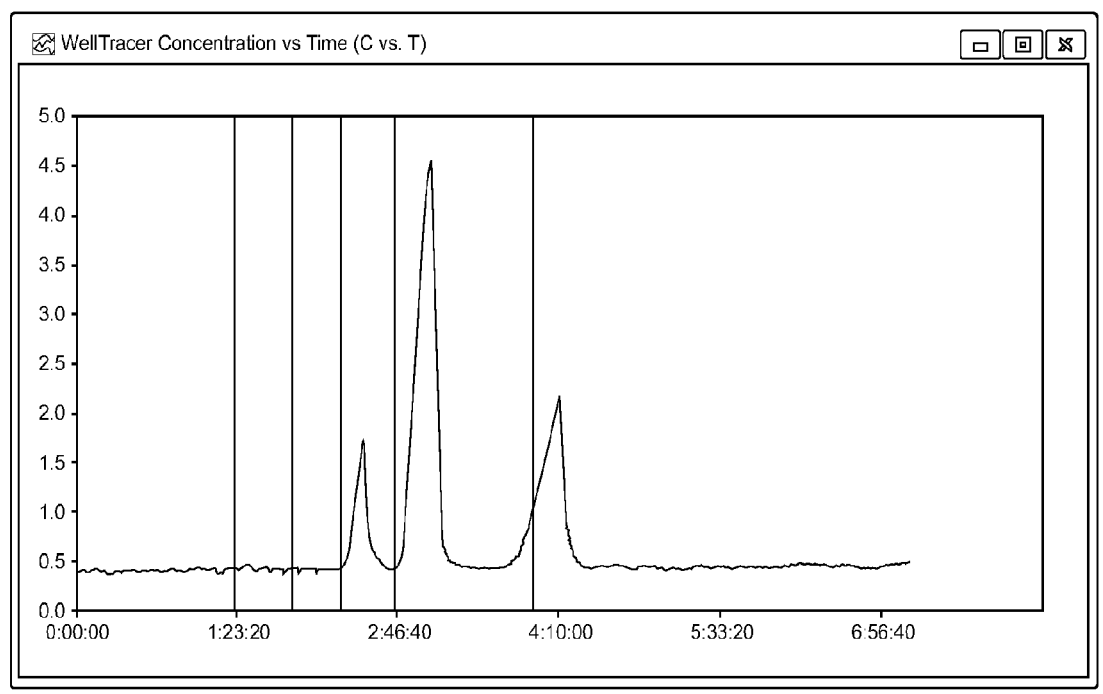
FIGS. 8A, 8B, and 8C depict sample graphical representations of velocity changes in accordance with one or more embodiments of the invention.
Figure 8B:
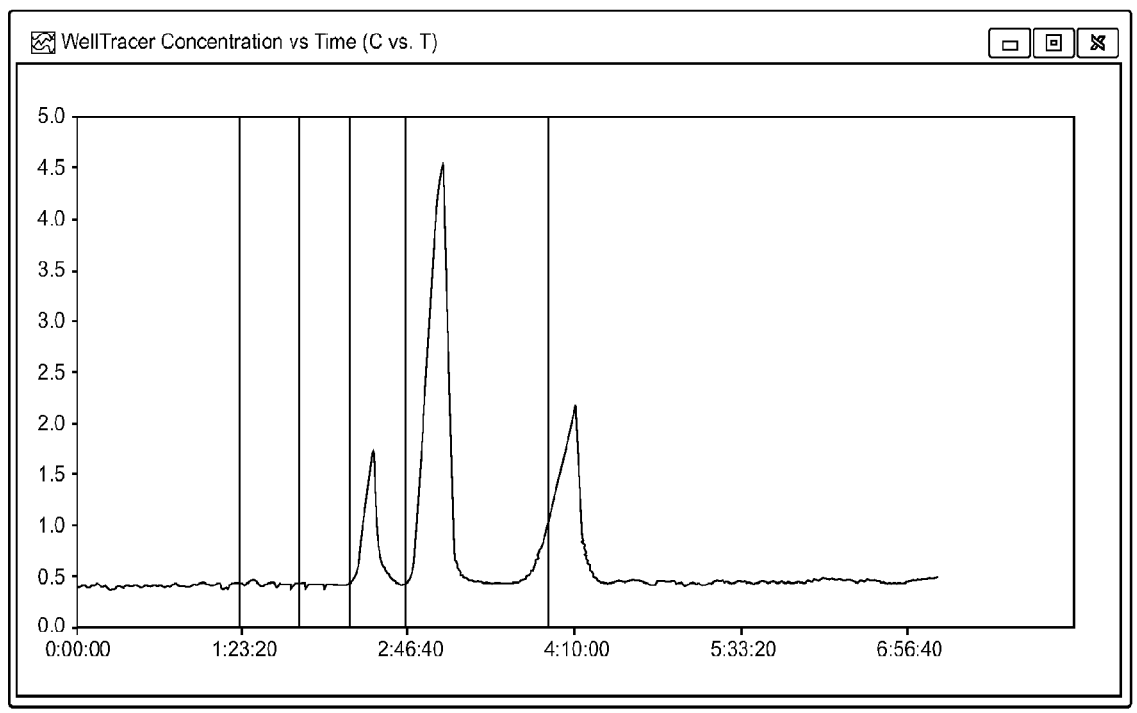
Figure 8C:
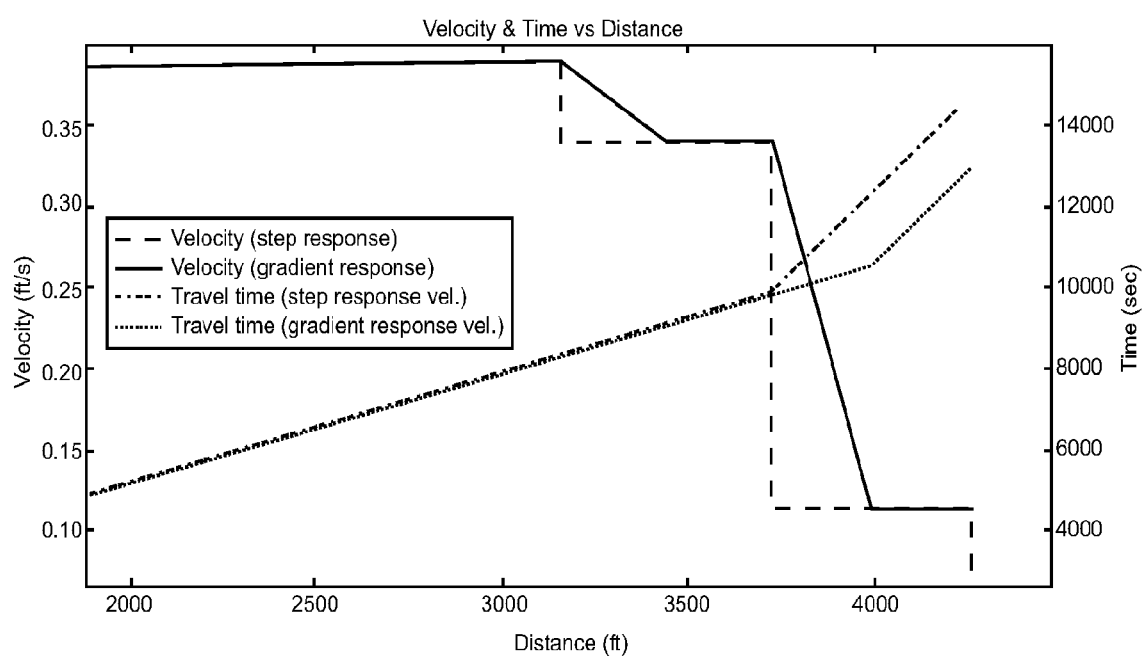

Conventional thinking has been that any changes to the velocity of the lift gas, due to a loss of the lift gas through an injection point, in the annulus or the production tubing is instantaneous as shown. However, Applicant discovered through extensive studies involving large samples of tracer data that such velocity changes are not instantaneous in reality. FIG. 8A, FIG. 8B, and FIG. 8C depicts a graphical representation of tracer concentration against time. FIG. 8A is graphical representation of a velocity change that is expected to occur instantaneously. FIG. 8B is a graphical representation of an actual velocity change in the annulus or the production tubing. It is clear by observing both FIG. 8A and FIG. 8B that the velocity change is non-instantaneous at, for example, 2:46:40 and 4:10:00.

Also, Applicant discovered the effect of such non-instantaneous velocity change is more pronounced as the number of tracer returns increases. Therefore, in order to ensure that the well depth calculated below a first injection point or an initial well depth is substantially accurate, it is important to account for the effects caused by the non-instantaneous velocity change.

According to one embodiment of the invention, a method for adjusting for non-instantaneous velocity changes in the annulus or the production tubing may include the step of initially determining the one or more lift gas loss parameters. The method may further include the step of calculating the velocity of the lift gas in the casing and in the tubing. The method may include the step of applying an injection loss factor to the calculated velocity in the casing and in the tubing at an initial or first injection point in order to account for the non-instantaneous velocity changes. The injection loss factor to be applied may be determined on the basis of: i) approximating a velocity change due to momentum; or ii) calculation of velocity change due to momentum. The application of the injection loss factor may cause an adjustment of the calculated velocity, that is, the adjusted velocity may be faster on average than the initially calculated velocity. The method may further include the step of applying the adjusted velocity to one or more remaining injection points. At each point of injection, the injection loss factor may be calculated based on the conditions at that point. This may be done to obtain a new velocity for conditions beyond the point of injection. This new velocity may only be utilized until the next injection point is reached. Each injection point reduces the amount of gas in the system, and therefore the above steps are repeated until all the injection gas may be accounted for and no injection gas remains in the system.

FIG. 10 depicts an example of how the travel time that results from instantaneous changes in velocity differs significantly from the travel time that includes even the approximated effects of momentum. As shown, the line labelled "Velocity (step response)" represents the velocity profile of gas in the casing when the velocity changes are taken to be instantaneous. This velocity profile has a marked stair-step appearance. The travel time calculated from this velocity profile is approximately 14,500 seconds. The line labelled "Velocity (gradient response)" represents the velocity profile when momentum is approximated by a simple gradient and demonstrates the effect of applying an injection loss factor at each injection point. The total travel time in this case is approximately 13,000 seconds. Note that the horizontal axis is distance, so the velocity lines are the velocity of gas in the casing at depth and the travel time lines represent the total time required for the gas in the casing to reach that depth.

Referring back to FIG. 4, in step S402, one or more successive ranges of well depth are identified. As used herein with respect to FIG. 4, successive ranges of well depth refer to ranges of well depth other than the initial range of well depth. The successive ranges of well depth may, for example, include all ranges of well depth other than the initial range of well depth, or may optionally include only some of the plurality of ranges of well depth other than the initial range. Subsequently, in step S403, a determination is made as to whether a velocity of the lift gas has been calculated for each of the identified successive ranges of well depth. If the determination in step S403 is YES, a lift gas velocity has been determined for each range of well depth, and the method ends. If the determination in step S403 is NO, then, based on predetermined criteria, a range of well depth is selected from among the ranges of well depth for which no lift gas velocity has been calculated (S404). The predetermined criteria that determine which range of well depth from among the successive ranges of well depth will be selected may be any criteria that allow a range of well depth to be unambiguously selected. For example, the predetermined criteria may require selection of the range of well depth having a smallest maximum well depth, where well depth in this scenario is measured from a point at or above a surface of the well. Alternately, the predetermined criteria may require selection of the range of well depth having the largest maximum well depth from among the identified ranges of well depth.

Thereafter, in step S405, values of the at least two parameters are determined for the selected range of well depth based on the determined values of the at least two parameters for the range of well depth that immediately precedes the selected range. For example, pressure and temperature may be determined for the selected range based on the pressure and temperature determined for the immediately preceding range. Subsequently, in step S406, the lift gas velocity is calculated for the selected range of well depth based on the determined values of the at least two parameters for the selected range of well depth. For example, the lift gas velocity may be calculated for the selected range based on the determined pressure and temperature corresponding to the selected range.

After the lift gas velocity has been calculated for the selected range of well depth, a determination is again made as to whether a lift gas velocity has been calculated for all successive ranges of well depth that have been identified (S403). If the determination in step S403 is YES, the iterative calculation of lift gas velocities is complete. If the determination is NO, a range of well depth is again selected from among the ranges of well depth for which no lift gas velocity has been calculated based on the predetermined criteria.

Referring back to FIG. 3, after a velocity of the lift gas in the annulus and a velocity of the lift gas in the production tubing have been calculated for each of the plurality of ranges of well depth, in step S307, one or more points of entry of the lift gas into the production tubing are determined. More specifically, the one or more points of entry of the lift gas into the production tubing are determined based on the one or more actual travel times of the tracer determined in step S302 and the velocity of the lift gas in the annulus and the velocity of the lift gas in the production tubing calculated for each of the plurality of ranges of well depth.

The one or more points of entry of the lift gas into the production tubing correspond to well depths at which lift gas is entering the production tubing. In accordance with one or more embodiments of the invention, the method illustrated in FIG. 3 may further include a step in which the one or more determined points of entry of the lift gas into the production tubing are compared to the one or more points of communication (used herein to refer to gas lift valves or the positions of gas lift valves along the production tubing). Such a comparison permits a determination to be made as to whether a particular determined point of entry of the lift gas corresponds to a leak of the lift gas into the production tubing or entry of the lift gas into the production tubing through a gas lift valve.

Figure 5:
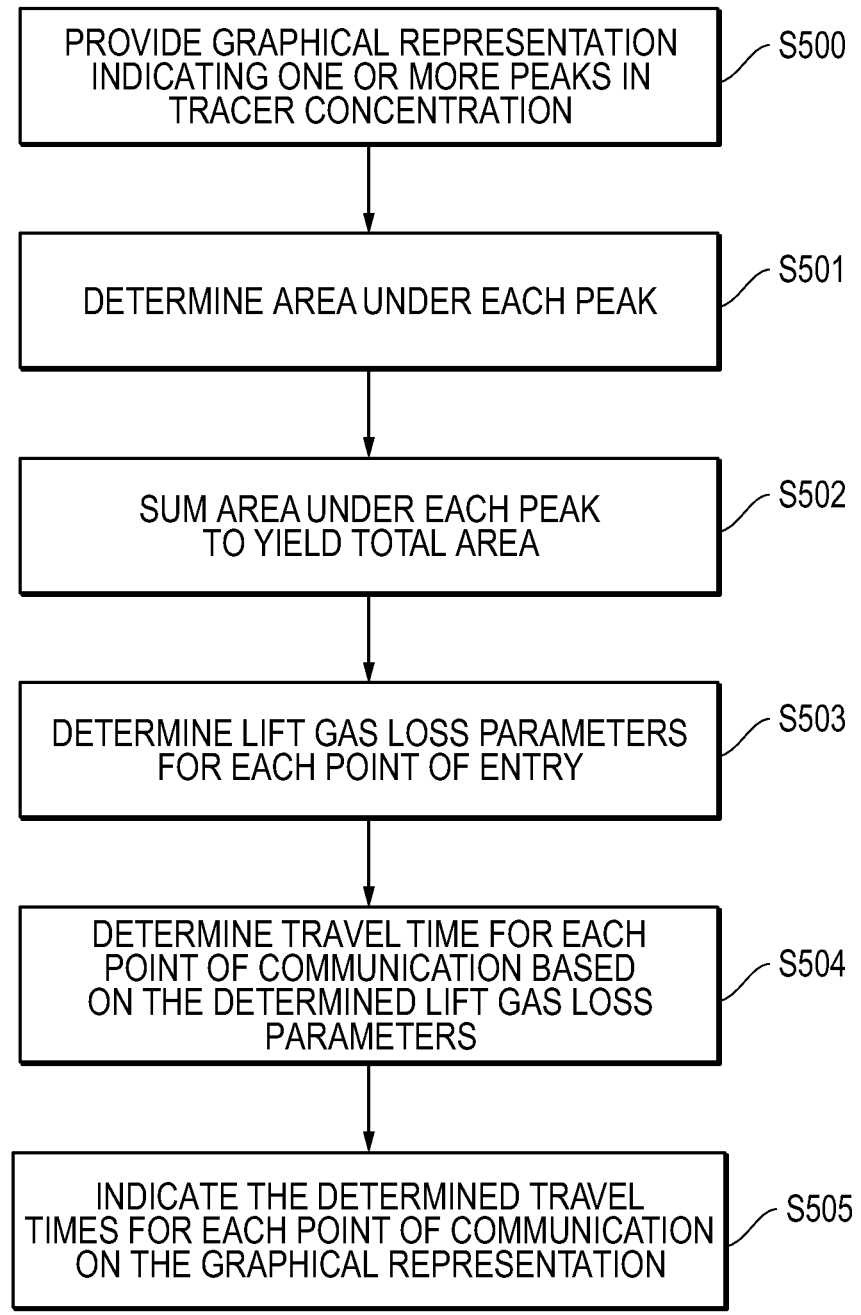
FIG. 5 depicts a flowchart illustrating a method in accordance with one or more embodiments of the invention.

The determination of one or more lift gas loss parameters in accordance with one or more embodiments of the invention will be described in greater detail through reference to FIG. 5. In an initial step S500, a graphical representation of the tracer concentration measured over a period of time is provided. The graphical representation may be a Cartesian plot of tracer concentration as a function of time. The units of measurement are not limited and may be any suitable units for measuring concentration and time. In one or more embodiments of the invention, the graphical representation may be generated by the computer program product (FIG. 1, element 80) of the gas lift well surveillance kit 10 and displayed through a user interface provided on, for example, the computing device 50. Alternately, the graphical representation may be transferred to a remote computing device through network communications means provided in the computing device 50 and displayed to a user on the remote computing device. As described earlier, the graphical representation may indicate a baseline tracer concentration. Further, the graphical representation may indicate one or more actual travel times of the tracer through one or more peaks in the tracer concentration. As discussed earlier, an actual travel time of the tracer is any deviation from a pattern present in the baseline tracer concentration. The term "pattern" does not require any regularity or periodicity in the baseline tracer concentration, but merely refers to a characteristic of the tracer concentration that identifies it as a baseline tracer concentration. The graphical representation will include a peak in tracer concentration for each actual travel time of the tracer.

After the graphical representation that includes one or more peaks is provided, in step S501, an area under each peak is determined. The area may be determined using integral calculus or another mathematical technique. Subsequently, in step S502, each determined area is summed to yield a total area. That is, the area under each peak is summed together to arrive at a total area under all peaks in tracer concentration.

Thereafter, in step S503, a lift gas loss parameter is determined for each point of entry. Each peak in the graphical representation corresponds to an actual travel time of the tracer. Each peak in tracer concentration also corresponds to an actual point of entry of the tracer, and thus the lift gas, from the annulus into the production tubing. An actual travel time of the tracer corresponds to duration from a time of injection of the tracer into the annulus until the tracer returns to a measurement point. Thus, each point of entry of the tracer will have an actual travel time associated with it. Further, each point of entry will have a corresponding peak on the graphical representation at the actual travel time of the tracer associated with that point of entry.

In step S503, a lift gas parameter is calculated for each point of entry by calculating a ratio of the area under the peak that corresponds to that point of entry with the total area under all the peaks. The lift gas parameter that corresponds to a particular point of entry may thus be correlated to the amount of tracer lost from the annulus into the production tubing at that point of entry. For example, if the area under a particular peak represents 25% of the total area under all peaks, it can be concluded that 25% of the total tracer injected into the annulus entered the production tubing at that point of entry (either through a leak in the production tubing or through a point of communication (i.e. valve).

After a lift gas loss parameter has been determined for each peak (point of entry), in step S504, a travel time of the tracer corresponding to each point of communication is determined based on the one or more determined lift gas parameters. As noted earlier, a point of communication generally corresponds to a valve, but more generally may correspond to any predetermined potential point of entry of lift gas into the production, in contrast to, for example, a leak into the production tubing which is not anticipated as a predetermined potential point of entry of lift gas. A tracer travel time for a particular point of communication corresponds to duration between a time of injection of the tracer into the annulus and time of return of the tracer to a point of measurement, assuming the tracer traveled down the annulus and entered the production tubing at the particular point of entry. The lift gas velocities in the annulus and in the production tubing which are determined for each of the plurality of ranges of well depth are used to determine the tracer travel times for each of the points of communication.

As an example, assume a graphical representation indicates two peaks in tracer concentration, and the lift gas parameter for peak 1 is 35% and the lift gas loss parameter for peak 2 is 65%. In determining the travel time of the tracer for a point of communication, all peaks corresponding to points of entry having well depths shallower than the point of communication are first identified. A well depth corresponding to a point of entry may be calculated based on the actual tracer travel time associated with the point of entry and the velocities of the lift gas in the annulus and in the production tubing that are calculated based on the one or more lift gas loss parameters. After the depth of each point of entry is determined, the relative depth of a point of communication may be ascertained, and as such, a determination as to which lift gas parameters will be used in determining the travel time for the point of communication may be made.

In the present example, assume that only peak 1 corresponds to a point of entry having a well depth shallower than the point of communication for which a travel time is being determined. In determining the travel time for the point of communication, a velocity of the lift gas in the annulus would not be affected by the peak 1 point of entry at a well depth that is shallower than the well depth of the peak 1 point of entry. A velocity of the lift gas in the annulus would be lowered by 35% (the lift gas loss parameter) for the range of well depth between the peak 1 point of entry and the point of communication. Similarly, a velocity of the lift gas in the production tubing for the range of well depth between the point of communication and the peak 1 point of entry would be unaffected by the peak 1 lift gas loss parameter. Further, for the range of well depth from the peak 1 point of entry to a measurement point, the velocity of the lift gas in the production tubing would be increased based on the lift gas parameter for peak 1 in order to compensate for the additional amount of lift gas entering the production tubing at the point of entry corresponding to peak 1.

In this manner, the travel time associated with a particular point of communication may be determined. After the travel times associated with the points of communication have been determined, they may be indicated on the graphical representation (S505). For example, in a sample graphical representation, the travel times associated with the points of communication may be indicated by vertical lines overlaying the continuous plot of tracer concentration as a function of time. In this manner, an operator or user of a gas lift well surveillance kit in accordance with one or more embodiments of the invention may quickly and efficiently determine whether a point of entry of the tracer/lift gas into production tubing corresponds to an operating valve or a leak, and if the point of entry corresponds to an operating valve, the user may further determine which valve(s) is operating. Thus, the gas lift well surveillance kit in accordance with one or more embodiments of the invention provides an efficient graphical means for comparing the actual travel times of the tracer (which correspond to points of entry) with the travel times determined for the points of communication (which correspond to valve positions) in order to determine whether a point of entry corresponds to entry of the lift gas into the production tubing through a particular point of communication (valve) or as a result of a leak. It should be noted that the well depths associated with each point of entry are determined using the velocities of the lift gas in the annulus and in the production tubing calculated for each of the plurality of ranges of well depth based on the one or more lift gas parameters, and the calculated well depths may be compared in a non-graphical manner to known well depths for each point of communication in order to determine whether each point of entry corresponds to entry of the lift gas through a valve or a leak in the production tubing.

It should be noted that any of the previously discussed embodiments of the invention, although discussed with reference to single completion tubular flow gas lift well configuration, may be used in connection with any type of gas lift well configuration known in the art including any multiple completion gas lift well (well that includes two or more production tubings). In the case of multiple completion gas lift wells, a velocity of the lift gas in the production tubing is calculated for each production tubing, for each range of well depth associated with the each production tubing. The velocities may be calculated using one or more of the parameters discussed earlier, and are further calculated based on the determined lift gas loss parameters.

A graphical representation indicating the concentration of the tracer measured over the period of time may be provided for each production tubing in a multiple completion gas lift well. A lift gas loss parameter may be determined for each peak in each graphical representation. An area under each peak for each graphical representation is determined and the areas are summed to yield a total area. Then, a lift gas loss parameter is determined for each peak, which corresponds to a ratio of the area under the peak to the total area under all peaks for both graphical representations. In determining the lift gas parameter for a particular peak it is necessary to sum the areas of all peaks included in all graphical representations because lift gas is injected into a common annulus in a multiple completion well and enters the two or more production tubings from the common annulus.

Figure 6A:
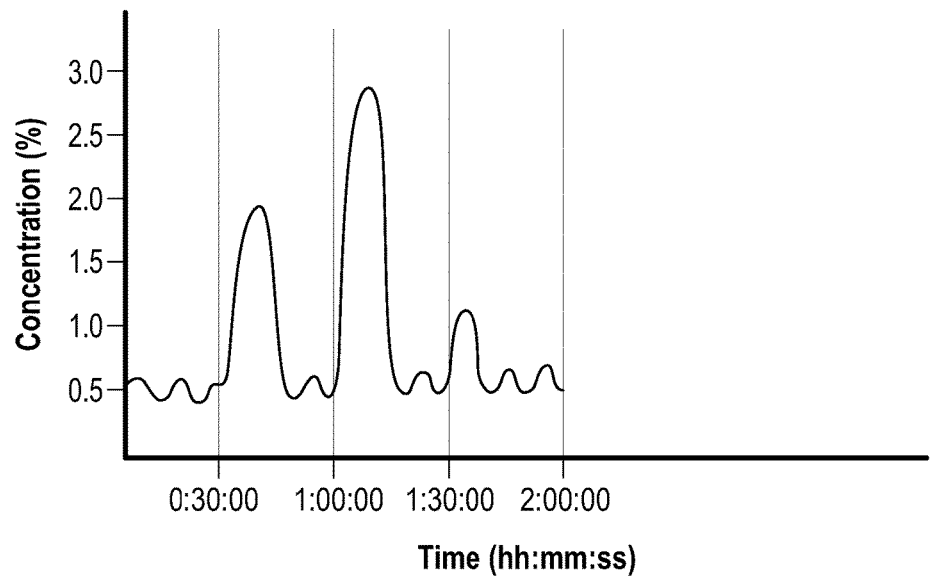
FIGS. 6A-6B depict sample graphical representations in accordance with one or more embodiments of the invention.
Figure 6B:
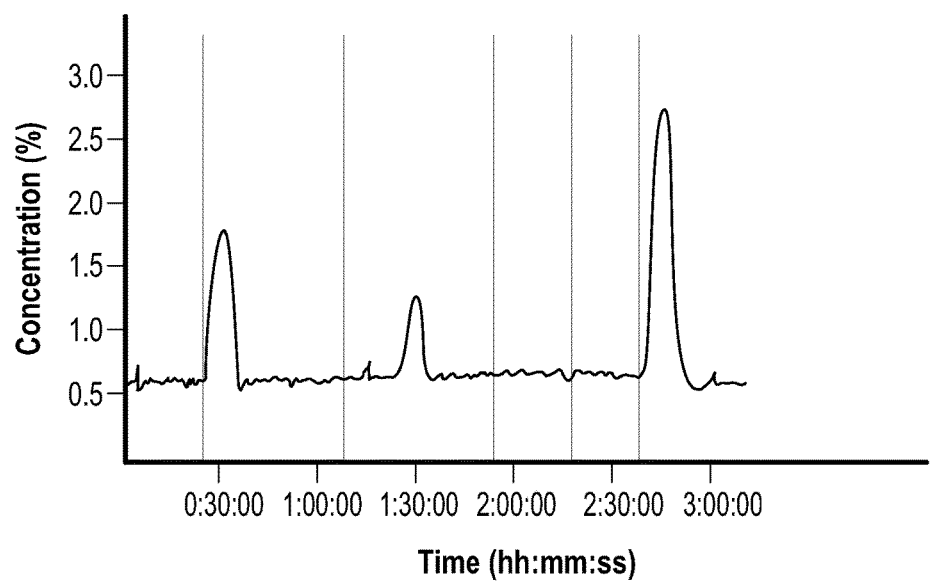

FIGS. 6A-6B depict sample graphical representations provided by a gas lift well surveillance kit in accordance with one or more embodiments of the invention. Each graph illustrates a continuous measurement of tracer concentration as a function of time. Vertical lines in each graph represent tracer travel times corresponding to each point of communication. The gas lift well that corresponds to the graph in FIG. 6A has four valves. A vertical line indicative of a travel time associated with each valve is included in the graph. As noted earlier, the travel time for each point of communication is calculated based on the lift gas loss parameters associated with each actual travel time of tracer (each point of entry). The graph in FIG. 6A includes three peaks. The baseline tracer concentration in FIG. 6A oscillates in a periodic sinusoidal manner. However, as discussed earlier, a regularity or periodicity in the baseline tracer concentration is not required. The graph in FIG. 6A provides a quick and efficient means for determining whether the peaks (points of entry of the lift gas into the production tubing) correspond to open valves or leaks in the production tubing. Visual examination of FIG. 6A indicates that the beginning of each peak coincides with a travel time for a point of communication. Thus, it can be determined that there are three points of entry of the lift gas into the production tubing, and the points of entry correspond to the three shallowest valves. The deepest valve does not appear to be operating. Further, there do not appear to be significant leaks of lift gas into the production tubing. The percentage of lift gas entering at each valve may be determined based on the lift gas loss parameters. That is, the percentage of lift gas entering at a particular point of entry corresponds to the ratio of the area under the peak associated with that point of entry to the total area under all peaks. From a visual inspection, it can quickly be determined that the percentage of lift gas entering through each valve in FIG. 6A is greatest for valve 2 and smallest for valve 3 (valve 1 being the valve with the shortest travel time).

FIG. 6B depicts a sample graphical representation corresponding to a different well configuration from that in FIG. 6A. The well represented by the graph in FIG. 6B includes five points of communication, which correspond to gas lift valves. As in FIG. 6A, vertical lines are present in the graph and indicate travel times calculated for each point of communication based on the velocities in the annulus and in the production tubing determined for each of the plurality of ranges of well depths based on one or more lift gas loss parameters. The tracer concentration has three peaks. In this graph, it is important to note that the baseline tracer concentration does not exhibit any regularity or periodicity. However, three peaks in the tracer concentration which correspond to actual travel times of the tracer and points of entry of the lift gas into the production tubing can be identified because the peaks represent deviations in a pattern present in the baseline tracer concentration. As discussed earlier, a pattern in the baseline tracer concentration may refer to any characteristic of the baseline tracer concentration that identifies it as such. In this example, the pattern in the baseline tracer concentration indicates small variation in the concentration that lacks any regularity. The peaks are identifiable as points of entry based on their deviation from the small variation present in the baseline tracer concentration.

Visual examination of the graph in FIG. 6B indicates peaks originating at the travel times associated with valves 1 and 5. Therefore, it can be concluded that valves 1 and 5 are operating and lift gas is entering the production tubing through these two valves. However, the second peak does not coincide with a travel time for any point of communication. Therefore, a possible conclusion is that a significant leak of lift gas into the production tubing is occurring at a well depth that corresponds to the point of entry represented by the second peak.

In another embodiment, a method of analyzing the performance of a gas lift well, for example, an unstable well, may involve conducting transient analysis. The method involves performing a transient simulation of the gas lift well to obtain a corresponding non-instantaneous variant of one or more key well parameters. The non-instantaneous variant of the key well parameters may be derived with a dynamic simulator.

The dynamic simulator may be pre-calibrated with one or more real time key well parameter data to drive steady state and transient simulation to account for time dependent variations in the one or more key well parameters and obtain a corresponding transient variant of the one or more key well parameters data. The transient data that may be derived from the dynamic simulator may be demonstrated in a multi-dimensional time dependent plot to generate a dynamic graph. The multi-dimensional time dependent plot may specify a relation between the well data in one set of transient data to well data in at least one other set of transient data to indicate a non-instantaneous variation in the gas lift well parameters. The results of the transient simulation may be further automatically adjusted. The adjustment may involve checking a consistency of a first set of simulator results, for example, current results, against a second set of simulator results, for example, an earlier version, and against steady state calculations based on the real time gas lift well parameter data to ensure an accepted range of variance and validity. The current results may be recalculated upon detecting any inconsistency. If the current results may be found to be acceptable, then the dynamic simulator can continue to a next step.

In one embodiment, an error function may be used to compare the results of the dynamic simulation with actual or real time data. The dynamic simulator may repeat the process in real time until an acceptable match may be found.

The computer program product (FIG. 1, 80) that is included in a gas lift well surveillance kit in accordance with one or more embodiments of the invention is configured to implement one or more of the previously described methods of the invention. For example, the computer program product includes instructions for calculating lift gas velocities in the annulus and in the production tubing using one or more complex models. The computer program product includes instructions for storing the annulus and production tubing parameters discussed earlier (also known as tubing string and casing string information) and using one or more of these parameters to determine lift gas velocities in the annulus and in the production tubing. Lift gas velocities in the production tubing may be calculated using a multiphase flow pressure model that includes various parameters related to the flow of gas in a multi-phase mixture. The computer program product may further include one or more user interface screens that provide a user with access to data and models. One or more graphs for studying the relationship between various parameters may be displayed through the one or more user interface screens. For example, the graphical representation of tracer concentration as a function of time has already been discussed. Plots or graphs indicating the relationship between the following parameters may also be displayed. Examples of such plots include, but are not limited to, Depth vs. Pressure, Depth vs. Temperature, Pressure vs. Production, Historical real-time data v. Time, Pressure v. Time, Flow Rates v. Time, and Pressure v. Injection.

In one or more embodiments of the invention, the computer program product includes instructions for analyzing fluctuating measurements and errors in measurements, validating and explaining tracer returns, analyzing the well from different points of view, viewing the well as a plot or tabular data of tracer concentration versus time while indicating expected travel times for each of the points of communication, calibrating the data to line actual travel times of the tracer with expected travel times calculated for each of the points of communication, checking the validity of the calibrations by viewing the well in other points of view (such as a plot or tabular depth versus pressure) to determine the expected injection points of the lift gas, and using high quality gas lift valve models to determine how much gas should pass through each valve.

For example, a graph of tracer concentration as a function of time may initially indicate a peak in tracer concentration that does not coincide with a particular point of communication. However, a plot of Depth v. Production Pressure may indicate a change in the slope of the curve at a well depth that corresponds to a particular point of communication. Thus, the Depth v. Pressure indicates that lift gas is entering through a particular valve even though the initial plot of tracer concentration v. time did not provide such an indication. By analyzing the data from a different point of view (i.e. the Depth v. Pressure curve), the actual travel times of the tracer and the parameters used to determine lift gas velocities in the annulus and in the production tubing may be calibrated to have the actual tracer travel times coincide with the appropriate points of communication in the tracer concentration v. time graph. Thus, viewing the data from multiple perspectives allows for the necessary calibration of the data.

Points of entry of the lift gas into the production tubing may also determined under unstable operating conditions. When unstable conditions exist, averages and/or weighted averages can be used to determine reasonable tracer travel times using SCADA data. SCADA data may refer to the one or more casing and tubing related parameters discussed earlier. In one or more embodiments of the invention, the computer program product includes instructions for determining weighted averages for measurements not measured by SCADA in order to obtain tracer travel time data.

In one or more embodiments, a method for accounting for unanticipated changes during a well survey is disclosed. The methods disclosed earlier in this application are typically intended for steady state flow pressure models. These models assume averages over the period of the well survey. However, these models may not be accurate when drastic and sustained changes occur during the well survey. Examples of drastic and sustained conditions may include, for example, a loss of the lift gas compressor during the operation of gas lift well for a period of time, or the well is shut-in for a period of time during the well survey.

The method for accounting for unanticipated changes during a well survey includes: injecting a tracer into an annulus formed between a well casing and a production tubing of the gas lift well, the annulus including a lift gas, the gas lift well including one or more points of communication between the annulus and the production tubing, wherein each of the one or more points of communication corresponds to a valve position; measuring, over a period of time, a concentration of the tracer present in a substance retrieved from the gas lift well; determining one or more actual travel times of the tracer based on a deviation of the concentration of the tracer measured over the period of time from a pattern present in a baseline tracer concentration, wherein each of the one or more actual travel times of the tracer corresponds to a point of entry of one or more points of entry of the lift gas into the production tubing; segmenting results from a gas lift well survey into one or more segments, wherein the one or more segments represent a reasonable average over the segment, and wherein an extreme change in conditions is indicative of a beginning of a new segment; determining one or more lift gas loss parameters, each of the one or more lift gas parameters corresponding to a point of entry, each of the one or more lift gas loss parameters accounting for an effect of entry of a portion of the tracer into the production tubing at the corresponding point of entry on the actual travel time of the tracer that enters the production tubing at each point of entry located at a depth greater than the corresponding point of entry; calculating a velocity of the lift gas in the annulus and a velocity of the lift gas in the production tubing for each of the plurality of ranges of well depth based on the one or more lift gas loss parameters; applying an injection loss factor to the calculated velocity of the lift gas in the annulus and the velocity of the lift gas in the production tubing to account for a non-instantaneous velocity changes, wherein the injection loss factor to be applied is determined on the basis of: i) approximating a velocity change due to momentum; or ii) calculation of velocity change due to momentum; and determining the one or more points of entry of the lift gas into the production tubing based on: (i) the one or more actual travel times of the tracer, and (ii) the velocity of the lift gas in the annulus and the velocity of the lift gas in the production tubing that are calculated for each of the plurality of ranges of well depth, wherein one or more of the steps of the method are controlled by at least one computer processor executing one or more computer program instructions stored on at least one memory device operatively coupled to the at least one processor.

In another embodiment, the method for accounting for unanticipated changes for accounting for unanticipated changes during a well survey includes: injecting a tracer into an annulus formed between a well casing and a production tubing of the gas lift well, the annulus including a lift gas, the gas lift well including one or more points of communication between the annulus and the production tubing, wherein each of the one or more points of communication corresponds to a valve position; measuring, over a period of time, a concentration of the tracer present in a substance retrieved from the gas lift well; determining one or more actual travel times of the tracer based on a deviation of the concentration of the tracer measured over the period of time from a pattern present in a baseline tracer concentration, wherein each of the one or more actual travel times of the tracer corresponds to a point of entry of one or more points of entry of the lift gas into the production tubing; segmenting results from a gas lift well survey into one or more segments, wherein the one or more segments represent a reasonable average over the segment, and wherein an extreme change in conditions is indicative of a beginning of a new segment; determining one or more lift gas loss parameters, each of the one or more lift gas parameters corresponding to a point of entry, each of the one or more lift gas loss parameters accounting for an effect of entry of a portion of the tracer into the production tubing at the corresponding point of entry on the actual travel time of the tracer that enters the production tubing at each point of entry located at a depth greater than the corresponding point of entry; calculating a velocity of the lift gas in the annulus and a velocity of the lift gas in the production tubing for each of the plurality of ranges of well depth based on the one or more lift gas loss parameters; and determining the one or more points of entry of the lift gas into the production tubing based on: (i) the one or more actual travel times of the tracer, and (ii) the velocity of the lift gas in the annulus and the velocity of the lift gas in the production tubing that are calculated for each of the plurality of ranges of well depth, wherein one or more of the steps of the method are controlled by at least one computer processor executing one or more computer program instructions stored on at least one memory device operatively coupled to the at least one processor.

In another embodiment of the invention, abnormal gas lift well operating conditions may be monitored by creating one or more identification cards for each key well parameter. Data on two or more key well parameters may be measured continually using a dynamic simulator or proven real time data. The measured key well data can be used to generate a dynamic graph that relates data in one set to data in at least one other set. The dynamic graph may be plotted in two or more dimensions. The shape of the identification card facilitates easily interpreting injection pump related problems, for example, when compared to a card showing ideal well conditions. The identification cards may, therefore, be used to diagnose and troubleshoot deviations from optimum gas lift well operating conditions.

In one or more embodiments, a method for analyzing surveyed well information under changing conditions is disclosed. The gas lift well conditions are traditionally simulated on a simulator based on surveyed results. However, occasionally the simulations may diverge from reality or actual conditions.

The method for analyzing surveyed well information under changing conditions includes automatically tuning a dynamic simulator derived transient simulation. The method further includes the following steps: (i) comparing a current simulator result against its previous results to ensure an accepted range of variance; (ii) comparing the current simulator result against a data source to ensure its validity; (iii) involving one or more key well parameter data in steady-state calculations within the comparisons; (iv) matching the current simulator result in steps (i)-(iii) and correcting the previous result and recalculating the current result upon detecting any inconsistency; and (v) using steps (ii) and (ii) to ensure a new current state is acceptable and, if so, permitting the simulator to continue to a next step.

In one embodiment, the key well parameter data may include well survey data. For each time period, one or more of the following key well parameters may be checked: injection pressure, production pressure, injection temperature, lift gas rate and tracer concentration.

In another embodiment, the simulator may be calibrated with real-time surface data. The data source may include real-time data. For each time period, one or more of the following key well parameters may be checked: injection pressure, production pressure, injection temperature, lift gas rate, production temperature, production manifold pressure and injection choke upstream pressure.

According to one embodiment, a method for evaluating an unstable gas lift well includes recording key well parameter data, using the gas lift well surveillance kit, as described earlier, during a preliminary well survey. The key well parameter data may be recorded on a real time basis or at periodic intervals. The method includes pre-calibrating a dynamic simulator known in the art with one or more real time key well parameter data to drive steady state or transient simulation. The transient simulation can account for transient or time dependent variations in the one or more key well parameters and obtain a corresponding transient variant of the one or more key well parameters data. The key well parameter data can be fed or entered into a dynamic simulator using known techniques. For example, the key well parameter data may be entered into the dynamic simulator by a keyboard, a touch screen, or it can be automatically using computer program instructions. The transient data that may be derived from the dynamic simulator may be demonstrated in a multi-dimensional time dependent plot to generate a dynamic graph. The multi-dimensional time dependent plot may specify a relation between the well data in one set of transient data to well data in at least one other set of transient data to indicate a non-instantaneous variation in the gas lift well parameters. The current/real time results may be recalculated upon detecting any inconsistency or if the data does not match a surveyed. If the current results may be found to be acceptable, then the dynamic simulator can continue to a next step. The results of the transient simulation may be further automatically adjusted. The adjustment may involve the following: (i) comparing a current simulator result against its previous results to ensure an accepted range of variance; (ii) comparing the current simulator result against a data source to ensure its validity; (iii) involving one or more key well parameter data in steady-state calculations within the comparisons; (iv) matching the current simulator result in steps (i)-(iii) and correcting the previous result and recalculating the current result upon detecting any inconsistency; and (v) using steps (ii) and (ii) to ensure a new current state is acceptable and, if so, permitting the simulator to continue to a next step. The matching may involve the use of a "comparison module" stored in the memory device. The comparison module can compare the real time key well parameters with heuristic techniques for evaluating the gas lift well. The comparison module may also provide recommendations to the user/operator for making adjustments to one or more key well parameters. For example, the operator could adjust casing or tubing pressure depending on the recommendations generated by the comparison module.

It is contemplated that the embodiments described herein are used in any operation employing lift gases to determine proper well functioning. While the foregoing is directed to embodiments of the present invention, other and further embodiments of the invention may be devised without departing from the basic scope thereof and the scope thereof is determined by the claims that follow. The inventions are not limited to the described embodiments, versions or examples, which are included to enable a person having ordinary skill in the art to make and use the inventions when the information in this patent is combined with available information and technology. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While the methods and computer program product are described in terms of "comprising," "containing," "involving," or "including" various steps or instructions, the methods and instructions also can "consist essentially of" or "consist of" the various steps and instructions. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

The invention claimed is:

1. A computer implemented method for evaluating the performance of a gas lift well, the method comprising:
   injecting a tracer into an annulus formed between a well casing and a production tubing of the gas lift well, the annulus including a lift gas, the gas lift well including one or more points of communication between the annulus and the production tubing, wherein each of the one or more points of communication corresponds to a valve position;
   measuring, over a period of time, a concentration of the tracer present in a substance retrieved from the gas lift well;
   adjusting the measured concentration of the tracer upon the condition that a pattern present in: (1) a plot of a baseline tracer concentration comprises substantial instability; or (2) a plot of a plurality of collected real time key well parameter data comprises substantial instability, wherein each of the key well parameters comprises at least one of: at least one of: (i) a plurality of pressures in the production tubing, each of the plurality of pressures corresponding to one of the plurality of ranges of well depth, (ii) a flow rate of the lift gas in the production tubing, (iii) a temperature in the production tubing, (iv) a parameter that represents a frictional force opposing flow in the production tubing, (v) a parameter that represents an effect of gravity on flow in the production tubing, (vi) a ratio of a gaseous phase to a non-gaseous phase in the substance retrieved from the gas lift well, (vii) a flow rate of one or more gases present in the substance retrieved from the gas lift well, (viii) a flow rate of one of more liquids present in the substance retrieved from the gas lift well, (ix) a well head pressure, and (x) a separator pressure; and
   generating one or more fractals by graphically representing the adjusted tracer concentration and the collected key well parameter data in a multi-dimensional time dependent plot for diagnosing an abnormal condition in the gas lift well, wherein a fractal is a chaotic pattern that produces irregular shapes and surfaces.

2. The method of claim 1, further comprising:
   determining one or more actual travel times of the tracer based on a deviation of the concentration of the tracer measured over the period of time from the pattern present in a baseline tracer concentration, wherein each of the one or more actual travel times of the tracer corresponds to a point of entry of one or more points of entry of the lift gas into the production tubing;
   determining one or more lift gas loss parameters, each of the one or more lift gas parameters corresponding to a point of entry, each of the one or more lift gas loss parameters accounting for an effect of entry of a portion of the tracer into the production tubing at the corresponding point of entry on the actual travel time of the tracer that enters the production tubing at each point of entry located at a depth greater than the corresponding point of entry;
   calculating a velocity of the lift gas in the annulus and a velocity of the lift gas in the production tubing for each of the plurality of ranges of well depth based on the one or more lift gas loss parameters;
   adjusting the calculated velocity at an initial injection point, wherein adjusting the calculated velocity comprises applying an injection loss factor to the calculated velocity to account for non-instantaneous velocity changes; and applying the adjusted velocity to a subsequent injection point, wherein the injection loss factor is re-calculated based on conditions at a subsequent injection point thereby obtaining an adjusted velocity for a next injection point.

3. The method of claim 2, further comprising:

determining the one or more points of entry of the lift gas into the production tubing based on:

(i) the one or more actual travel times of the tracer, and (ii) the velocity of the lift gas in the annulus and the velocity of the lift gas in the production tubing that are calculated for each of the plurality of ranges of well depth, wherein one or more of the steps of the method are controlled by at least one computer processor executing one or more computer program instructions stored on at least one memory device operatively coupled to the at least one processor.

4. The method of claim 2, further comprising:

calculating a travel time of the tracer for each of the one or more points of communication between the annulus and the production tubing based on the velocity of the lift gas in the annulus and the velocity of the lift gas in the production tubing that are calculated for each of the plurality of ranges of well depth.

5. The method of claim 2, further comprising:

displaying a graphical representation on an output device the concentration of the tracer measured over the period of time, wherein the graphical representation indicates the travel time of the tracer calculated for each of the one or more points of communication between the annulus and the production tubing, and wherein upon the condition that the graphical representation includes one or more peaks in the concentration of the tracer measured over the period of time, each of the one of more peaks corresponding to one of the one or more actual travel times, one of the one or more points of entry of the lift gas into the production tubing, and one of the one or more lift gas loss parameters, the one or more lift gas loss parameters being determined by: (i) determining an area under each of the one or more peaks; (ii) summing each area determined for each of the one or more peaks to obtain a total area; and (iii) determining, for each of the one or more peaks, a ratio of the area under the each of the one or more peaks to the total area, the ratio representing the lift gas loss parameter corresponding to the each of the one or more peaks.

6. The method of claim 2, further comprising:

comparing the one or more determined points of entry of the lift gas to the one or more points of communication in order to determine, for each of the one or more determined points of entry of the lift gas, whether the point of entry corresponds to a leak of the lift gas into the production tubing or entry of the lift gas into the production tubing through a valve.

7. The method of claim 2, further comprising:

separating a gaseous phase from the substance retrieved from the gas lift well; and measuring, over a period of time, a concentration of the tracer present in the gaseous phase.

8. The method of claim 2, wherein a velocity of the lift gas in the annulus for a second range of the plurality of ranges of well depth is calculated further based on a temperature in the annulus and a pressure in the annulus that correspond to a first range of the plurality of ranges of well depth.

9. The method of claim 2, wherein the velocity of the lift gas in the production tubing is calculated using a dynamic multi-phase flow pressure simulator, and wherein the performance of the gas lift well is evaluated by continuously measuring data for each of the key well parameters based on the dynamic simulator or proven real time data.

10. The method of claim 1, wherein diagnosing an abnormal condition in the gas lift well comprises visually inspecting the generated fractal.

11. The method of claim 1, wherein diagnosing an abnormal condition in the gas lift well comprises comparing the generated fractal with a pattern obtained by plotting a plurality of optimal key well parameter data.

12. The method of claim 1, further comprises alerting a well operator upon diagnosing an abnormal condition in the gas lift well.

13. A gas lift well surveillance kit for evaluating the performance of a gas lift well according to claim 1, wherein the gas lift surveillance kit comprises: a separator; a tracer measurement device; a device for sensing and measuring pressure and temperature; a flow regulation device; a data collection and storage device; a non-transitory computer-readable medium; at least one of a power source, a pressure gauge, and tubing for connecting the gas lift well surveillance kit to the gas lift well, and wherein at least one of: the tracer measurement device is a spectrometer, the data collection and storage device is a datalogger, and the device for sensing pressure and temperature is a transducer.

14. A gas lift well surveillance kit for evaluating the performance of a gas lift well according to claim 2, wherein the gas lift surveillance kit comprises: a separator; a tracer measurement device; a device for sensing and measuring pressure and temperature; a flow regulation device; a data collection and storage device; a non-transitory computer-readable medium; at least one of a power source, a pressure gauge, and tubing for connecting the gas lift well surveillance kit to the gas lift well, and wherein at least one of: the tracer measurement device is a spectrometer, the data collection and storage device is a datalogger, and the device for sensing pressure and temperature is a transducer.

* * * * *